United States Patent
Matsuura et al.

(10) Patent No.: US 8,289,441 B2
(45) Date of Patent: Oct. 16, 2012

(54) IMAGING APPARATUS AND IMAGING CONTROL METHOD

(75) Inventors: Takayuki Matsuura, Kurokawa-gun (JP); Takehiko Senba, Kurokawa-gun (JP)

(73) Assignee: FUJIFILM Corporation, Tokyo (JP)

( * ) Notice: Subject to any disclaimer, the term of this patent is extended or adjusted under 35 U.S.C. 154(b) by 287 days.

(21) Appl. No.: 12/829,103

(22) Filed: Jul. 1, 2010

(65) Prior Publication Data

US 2011/0001859 A1 Jan. 6, 2011

(30) Foreign Application Priority Data

Jul. 2, 2009 (JP) ................................. 2009-157981

(51) Int. Cl.
  *H04N 5/235* (2006.01)
  *H04N 5/217* (2011.01)

(52) U.S. Cl. ......................... 348/362; 348/241

(58) Field of Classification Search .................. 348/362, 348/241
See application file for complete search history.

(56) References Cited

U.S. PATENT DOCUMENTS

| 2008/0056697 A1* | 3/2008 | Perala et al. ................... 396/56 |
| 2008/0239126 A1 | 10/2008 | Wakamori |
| 2010/0026853 A1* | 2/2010 | Mokhnatyuk .............. 348/240.2 |
| 2010/0123810 A1* | 5/2010 | Greenland et al. ............ 348/294 |
| 2010/0329657 A1* | 12/2010 | Hosoi et al. ................... 396/169 |

FOREIGN PATENT DOCUMENTS

| JP | 2006-064974 A | 3/2006 |
| JP | 2007-006097 A | 1/2007 |
| JP | 2007-049363 A | 2/2007 |
| JP | 2008-252195 A | 10/2008 |

* cited by examiner

*Primary Examiner* — James Hannett
(74) *Attorney, Agent, or Firm* — Sughrue Mion, PLLC

(57) ABSTRACT

According to the present invention, the imaging apparatus of the rolling shutter system first exposes/reads odd lines of an imaging sensor and then exposes/reads even lines. An image of one line is formed by sorting information of the lines, which is obtained by reading the information of the odd lines first and reading the information of the even lines later, in order of line positions. As a result, exposure start timing of adjacent odd/even lines is significantly shifted, and the exposure unevenness has a periodic stripe pattern when the exposure unevenness caused by flash emission of another person, etc. occurs on an image of one frame. Therefore, accurate detection of exposure unevenness caused by flash emission of another person in an imaging apparatus of a rolling shutter system can be achieved.

28 Claims, 28 Drawing Sheets

FLASH EMISSION

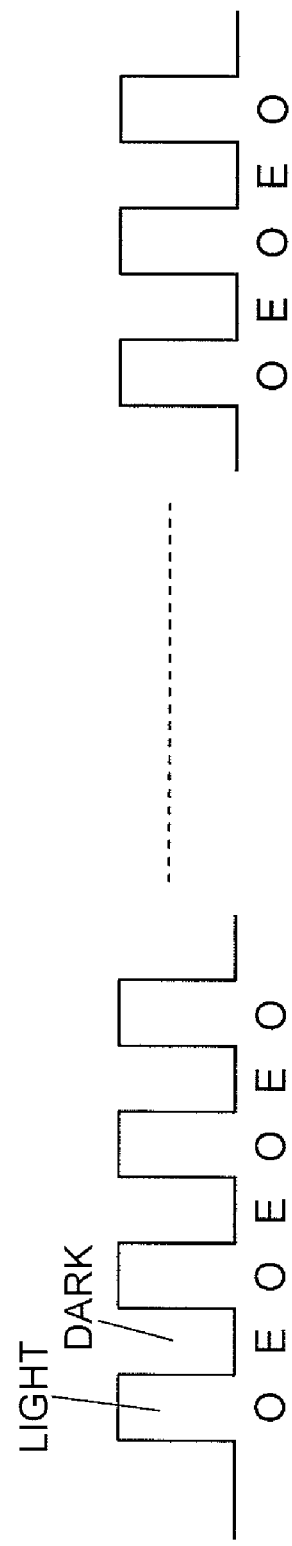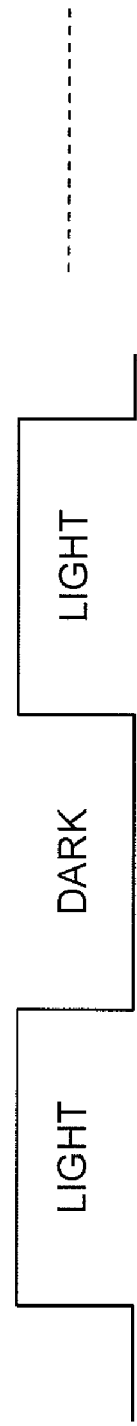
FIG.5A
FIG.5B

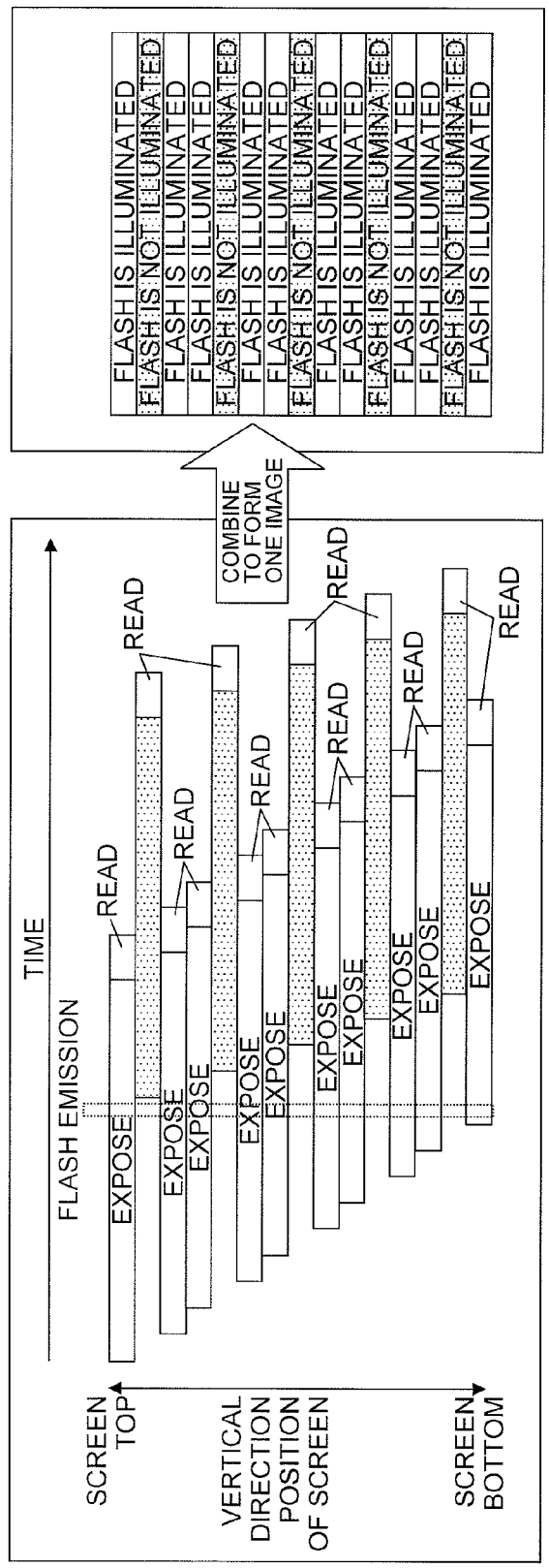

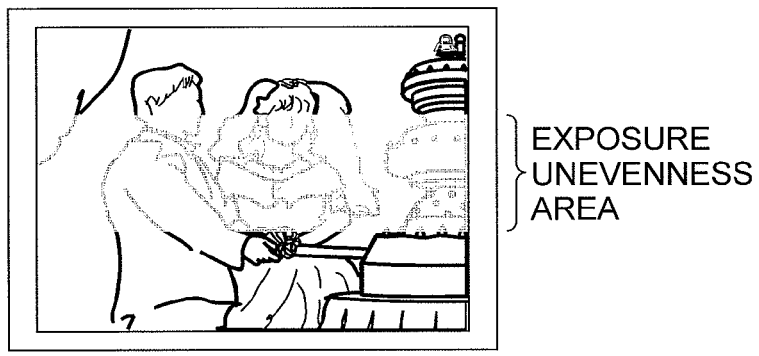
FIG.12A — EXPOSURE UNEVENNESS AREA
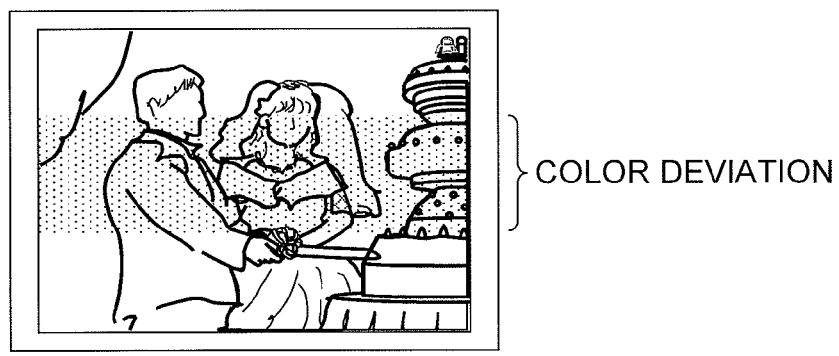
FIG.12B — COLOR DEVIATION
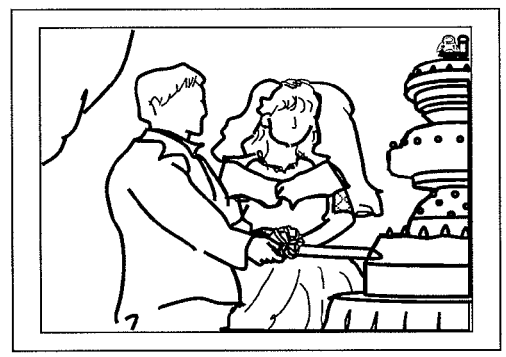
FIG.12C

IMAGING APPARATUS AND IMAGING CONTROL METHOD

BACKGROUND OF THE INVENTION

1. Field of the Invention

The present invention relates to an imaging apparatus and an imaging control method, and particularly, to a technique applied to an imaging apparatus of a rolling shutter system.

2. Description of the Related Art

An imaging apparatus has been proposed in which flash emission and exposure timing are matched to prevent in-plane exposure unevenness in a camera with focal plane shutter (Japanese Patent Application Laid-Open No. 2006-64974).

It is known that a reading system in an image apparatus using a CMOS image sensor is a rolling shutter system, in which sequential resetting is performed from the top, and sequential reading is performed.

The rolling shutter system is characterized in that there is a time difference in the exposure timing of the lines as shown in FIG. 26. Therefore, if intense light with short emission period, such as a flash, enters during an exposure period of part of the lines as shown in FIG. 27, areas of the part of the lines are brighter than areas of the other lines. There is a problem that in-plane exposure unevenness occurs as shown in FIG. 28.

Furthermore, there is a time difference in the exposure timing of the lines in the rolling shutter system. Therefore, there is a problem that the image of an object is distorted in case of a moving object.

Japanese Patent Application Laid-Open No. 2006-64974 proposes a camera system in which, the running speed of the back curtain is changed in the camera with focal plane shutter to allow artificial flat emission by a flash device, and the exposure unevenness does not occur in high-speed flash imaging.

Japanese Patent Application Laid-Open No. 2008-252195 proposes an imaging apparatus that can take an image of a moving object without distorting the image even if there is no mechanism for the global shutter.

In the imaging apparatus described in Japanese Patent Application Laid-Open No. 2008-252195, a blank period, in which pixel signals are not read at all, is set in a period from the completion of reading of a pixel signal of one screen to the start of reading of a pixel signal of one screen, and a light emitting diode is lit throughout a certain period in the blank period. The emission from the light emitting diode serves as imaging fill light, and the image of the moving object can be taken without distortion. Furthermore, the emission within the blank period prevents the exposure unevenness caused by the imaging fill light.

Japanese Patent Application Laid-Open No. 2007-6097 proposes a camera in which a live view display is not updated during the irradiation of fill light for distance measurement to thereby prevent highlight clipping of the live view display screen.

Japanese Patent Application Laid-Open No. 2007-49363 proposes a camera in which an artificial highlight clipping image is displayed during the irradiation of fill light for distance measurement to allow the user to visually recognize that the fill light is being irradiated.

SUMMARY OF THE INVENTION

However, the inventions described in Japanese Patent Application Laid-Open Nos. 2006-64974 and 2008-252195 are techniques for reducing the exposure unevenness when a flash device arranged in an imaging apparatus emits a flash. Although emission timing of the flash device arranged on the imaging apparatus can be controlled, the emission timing of flashlight of a camera possessed by another person cannot be controlled.

The inventions described in Japanese Patent Application Laid-Open Nos. 2007-6097 and 2007-49363 are inventions related to highlight clipping of a live view display screen due to the irradiation of fill light for distance measurement and are not inventions for the incidence of fill light (flash) entering during imaging of a main image.

Therefore, in a scene such as a wedding ceremony or a press conference, in which a large number of cameras emit flashes at the same time, exposure unevenness occurs in the screen due to flashlight emitted by a camera possessed by another person when an image is taken by the imaging apparatus of the rolling shutter system. However, the inventions described in Japanese Patent Application Laid-Open Nos. 2006-64974, 2008-252195, 2007-6097, and 2007-49363 cannot solve the problem.

Furthermore, there is a request of recording an image in accurate synchronization with a shutter release operation.

The present invention has been made in view of the circumstances, and an object of the present invention is to provide an imaging apparatus and an imaging control method capable of taking an image without exposure unevenness in synchronization with a shutter release operation even in a scene with flash emission of another person when the image is taken in a rolling shutter system.

To attain the object, the invention according to a first aspect provides an imaging apparatus of a rolling shutter system that starts exposing an imaging element including a light receiving area with a plurality of lines while shifting exposure start timing line by line and that sequentially reads out information on the lines from lines in which a predetermined exposure time has passed, the imaging apparatus comprising: a read control device that reads out the information of the lines by controlling read-out lines so that the exposure start timing of all lines of the imaging element is different and the exposure start timing of adjacent lines is significantly shifted on a periodic basis; an imaging acquisition device that acquires an image of one frame by sorting the information of the lines sequentially read out by the read control device in order of line positions; and an exposure unevenness detection device that detects presence of exposure unevenness included in the acquired image of one frame and caused by flash emission of another person.

According to the invention of the first aspect, the information of the lines is read out by controlling the read-out lines so that the exposure start timing of the periodically adjacent lines is significantly shifted. Therefore, the exposure unevenness has a periodic stripe pattern when exposure unevenness caused by flash emission of another person, etc. occurs on an image of one frame. As a result, for example, the case in which the luminance distribution of an object is different in upper and lower parts of one frame is not erroneously determined as exposure unevenness, and the exposure unevenness caused by flash emission of another person, etc. can be accurately detected.

Furthermore, when an image of a moving object is taken, there is an advantage that the distortion of the image of the moving object can be reduced compared to when the exposure is performed by sequentially shifting the exposure start timing from the first line to the last line.

A second aspect provides the imaging apparatus according to the first aspect, wherein the read control device reads out the information of odd lines earlier or later among the odd lines and even lines of the imaging element and reads out the information of the even lines later or earlier to significantly shift the exposure start timing of the adjacent odd lines and even lines.

A third aspect provides the imaging apparatus according to the first aspect, wherein the read control device reads out the information of (3n-2) lines (n=1, 2, 3 . . . ) and 3n lines earlier or later among the (3n-2) lines, (3n-1) lines, and 3n lines of the imaging element and reads out the information of the (3n-1) lines later or earlier to significantly shift the exposure start timing of the (3n-1) lines as well as the (3n-2) lines and the 3n lines before and after the (3n-1) lines.

A fourth aspect provides the imaging apparatus according to any one of the first to third aspects, wherein the exposure unevenness detection device calculates average luminance of the lines of every line or every N-th line (N: integer two or more) read out with significantly shifted exposure start timing to detect the exposure unevenness based on a change in the average luminance.

A fifth aspect provides the imaging apparatus according to the fourth aspect, wherein the exposure unevenness detection device determines that there is exposure unevenness if the change in the calculated average luminance has a cycle corresponding to intervals of the lines of every line or every N-th line.

A sixth aspect provides the imaging apparatus according to any one of the first to third aspects, wherein the exposure unevenness detection device compares the information of the adjacent lines read out with significantly shifted exposure start timing and determines that there is exposure unevenness if there is a substantially constant luminance difference throughout the entire lines.

In the information of the adjacent lines read out so that the exposure start timing is significantly shifted, if flash emission of another person, etc. enters only on the lines of one group, the luminance of the information of the lines of the one group is larger than that of the information of the adjacent lines of the other group throughout the entire lines. If there is a luminance difference in the information of the adjacent lines due to an imaging scene, there is no substantially constant luminance difference throughout the entire lines, and the plus or minus and the size of the luminance difference are random. The exposure unevenness caused by the irradiation of flash emission of another person, etc. can be accurately detected based on the disparity in the luminance difference across the entire lines.

A seventh aspect provides the imaging apparatus according to any one of the first to sixth aspects, further comprising an exposure unevenness warning device that issues a warning indicative of exposure unevenness if the exposure unevenness detection device detects the exposure unevenness. Re-imaging is prompted by the warning, and the photographer can perform re-imaging to take an image without exposure unevenness.

An eighth aspect provides the imaging apparatus according to any one of the first to seventh aspects, further comprising an exposure unevenness correction device that corrects the information of high-luminance lines, which emerge as periodic exposure unevenness, based on the information of low-luminance lines adjacent to the high-luminance lines if the exposure unevenness detection device detects the exposure unevenness.

A ninth aspect provides the imaging apparatus according to the eighth aspect, wherein the exposure unevenness correction device calculates an average luminance difference in one line between the information of the high-luminance lines and the information of the low-luminance lines adjacent to the high-luminance lines and subtracts the calculated average luminance difference from the information of the high-luminance lines to correct the information of the high-luminance lines.

A tenth aspect provides the imaging apparatus according to the ninth aspect, wherein the information of the lines is values of R, G, and B pixels, and the exposure unevenness correction device sorts the calculated average luminance difference by ratio of R, G, and B corresponding to the color temperature of the flashlight and subtracts the sorted R, G, and B values from the values of the R, G, and B pixels of the high-luminance lines.

The invention of an eleventh aspect provides an imaging control method of a rolling shutter system for starting to expose an imaging element including a light receiving area with a plurality of lines while shifting exposure start timing line by line and for sequentially reading out information on the lines from lines in which a predetermined exposure time has passed, the imaging control method comprising: a step of reading out the information of the lines by controlling read-out lines so that the exposure start timing of all lines of the imaging element is different and the exposure start timing of adjacent lines is significantly shifted on a periodic basis; a step of acquiring an image of one frame by sorting the information of the sequentially read out lines in order of line positions; and a step of detecting presence of exposure unevenness included in the acquired image of one frame and caused by flash emission of another person.

A twelfth aspect provides the imaging control method according to the eleventh aspect, further comprising a step of issuing a warning indicative of exposure unevenness if the exposure unevenness is detected.

A thirteenth aspect provides the imaging control method according to the eleventh or twelfth aspect, further comprising a step of correcting the information of high-luminance lines, which emerge as periodic exposure unevenness, based on the information of low-luminance lines adjacent to the high-luminance lines if the exposure unevenness is detected.

According to the present invention, an image can be taken without exposure unevenness in synchronization with a shutter release operation even in a scene with flash emission of another person when the image is taken in the rolling shutter system.

Particularly, at the imaging in the rolling shutter system, the information of the lines is read out by controlling the read-out lines so that the exposure start timing of all lines in the imaging element is different, and the exposure start timing of the periodically adjacent lines is significantly shifted. Therefore, if there is exposure unevenness caused by flash emission of another person, etc. in an image of one frame, the exposure unevenness has a periodic stripe pattern, and the exposure unevenness caused by the flash emission of another person, etc. can be accurately detected. There is also an advantage that the distortion of an image of a moving object is reduced. Furthermore, there is information of high-luminance lines and normal lines corresponding to the exposure unevenness between the adjacent lines when the exposure unevenness is detected. Therefore, the information of the high-luminance lines can be corrected based on the information of the adjacent normal lines.

BRIEF DESCRIPTION OF THE DRAWINGS

FIGS. 5A and 5B are diagrams showing a periodical change in in-plane exposure unevenness caused by flashlight of a camera of another person;

FIG. 7A is a diagram showing another example of controlling the reading lines to significantly shift the exposure start timing;

FIG. 7B is a diagram showing occurrence of stripe in-plane exposure unevenness;

FIGS. 12A to 12C are diagrams used to explain a method of correcting exposure unevenness without generating color deviation;

DETAILED DESCRIPTION OF THE PREFERRED EMBODIMENTS

Embodiments of an imaging apparatus and an imaging control method according to the present invention will now be described with reference to the attached drawings.

[Imaging Apparatus]

Figure 1:
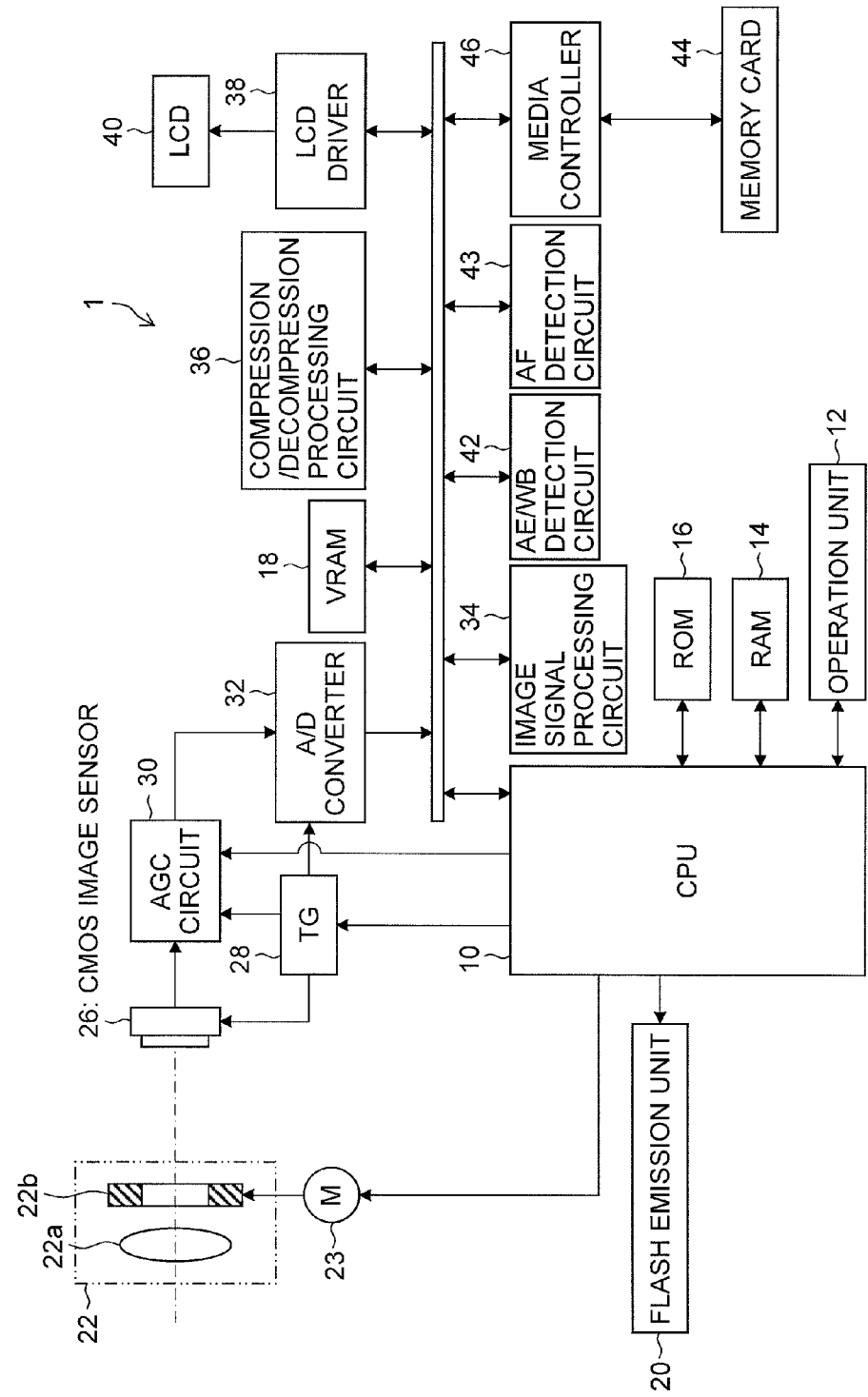
FIG. 1 is a block diagram showing an internal configuration of an imaging apparatus according to the present invention.

FIG. 1 is a block diagram showing an internal configuration of the imaging apparatus according to the present invention.

As shown in FIG. 1, an imaging apparatus (digital camera) 1 mainly comprises a central processing unit (CPU) 10, an operation unit 12, a flash emission unit 20, a lens unit 22, a CMOS image sensor 26, a timing generator (TG) 28, an AGC circuit 30, an A/D converter 32, an image signal processing circuit 34, a compression/decompression processing circuit 36, an LCD driver 38, a liquid crystal display (LCD) 40, an AE/WB detection circuit 42, an AF detection circuit 43, a memory card 44, and a media controller 46.

The CPU 10 comprehensively controls the entire digital camera 1 in accordance with a predetermined control program based on an operation signal inputted from the operation unit 12. Control programs and various setting information for operating the digital camera 1 are written in the ROM 16 connected to the CPU 10, and the CPU 10 controls the components in accordance with the programs.

The operation unit 12 comprises a shutter release button, a power/mode switch, a mode dial, a zoom key, an arrow key, a menu/OK key, a BACK key, etc.

The shutter release button instructs various imaging preparation processes such as automatic exposure control (AE control) and automatic focus control (AF control) during a half-press operation (when S1 is ON) and instructs a process of main imaging during a full-press operation (when S2 is ON) in which the shutter release button is further pressed from the state.

The power mode switch is operated to switch on/off the power of the digital camera 1.

The mode dial is operated to switch the operation mode of the digital camera 1. Examples of the operation mode includes a still image (single shooting) imaging mode for taking an image once, a continuous imaging mode for continuously taking a plurality of images, and a reproduction mode for reproducing and displaying the images obtained by imaging on the LCD 40.

The zoom key is operated to change the scale of the zoom lens.

The arrow key moves the cursor in the menu screen displayed on the LCD 40.

The menu/OK key is operated to display the menu screen on the LCD 40 or to determine the content of selection. Operations of the menu/OK key, the arrow key, etc. allows to set a desired imaging scene from various imaging scenes (such as indoors, people, and night view). The imaging scene function is a function for automatically setting various imaging conditions in accordance with a set imaging scene. The CPU 10 automatically sets imaging conditions, such as control parameters of exposure value, imaging sensitivity, and white balance as well as the presence of flash emission, to vales suitable for the imaging scene in accordance with the set imaging scene. The imaging scene may be set by a function by the CPU 10 to automatically determine the imaging scene to set an optimal imaging scene (automatic scene recognition).

The BACK key is operated to turn back the menu screen displayed on the LCD 40. The RAM 14 is used as an operation area of calculation by the CPU 10 and a temporary storage area of image data. The ROM 16 stores control programs executed by the CPU 10, various data necessary for the control, and various setting information related to the operation of the digital camera 1. The VRAM 18 temporarily stores image data for displaying a live preview image, etc.

The flash emission unit 20 directs a flash during imaging in accordance with the object luminance.

The lens unit 22 mainly comprises a zoom mechanism, a focus mechanism, and an aperture. The zoom mechanism moves an imaging lens 22a for zooming in response to the operation of the zoom operation key. The focus mechanism moves the focus lens incorporated into the imaging lens 22a to adjust the focus. An aperture device 22b adjusts the opening of the aperture to adjust the light intensity of the object light entering the CMOS-type image sensor 26 (hereinafter, called CMOS image sensor 26). The CPU 10 controls the operation of the aperture device 22b through a motor 23.

The CMOS image sensor 26 includes a light receiving surface with a plurality of lines on which a multiplicity of photo sensors are aligned in matrix, and the photo sensors convert an object image formed on the light receiving surface into a signal charge in accordance with the incident light intensity.

Amplifiers of the photo sensors convert the charge accumulated on the photo sensors into a voltage signal, and the voltage signal is outputted as an analog image signal based on a timing signal inputted from the timing generator (TG) 28.

Specifically, the CMOS image sensor 26 sequentially selects read-out lines based on a vertical scan signal applied from the TG 28 through a vertical scan circuit. A signal of selected one line is read out to a CDS circuit (sampling two correlation pile circuit). The CDS circuit holds the signal based on a timing signal inputted from the TG 28 and removes the noise. The signal of one line held in the CDS circuit is sequentially read out to an output line based on a horizontal scan signal applied through a horizontal scan circuit.

Reset signals are sequentially applied to the lines selected by the vertical scan circuit after the signal transfer. The charge of the photo sensors is reset, and then the accumulation of the charge is started again.

When the vertical scan circuit scans from the top line to the last line of the CMOS image sensor 26, the circuit returns to the top line. This constitutes a rolling shutter with one frame cycle. Appropriately setting the read timing and the reset timing of each line can set the time (shutter speed) from the reset of the photo sensor to the reading.

Figure 2:
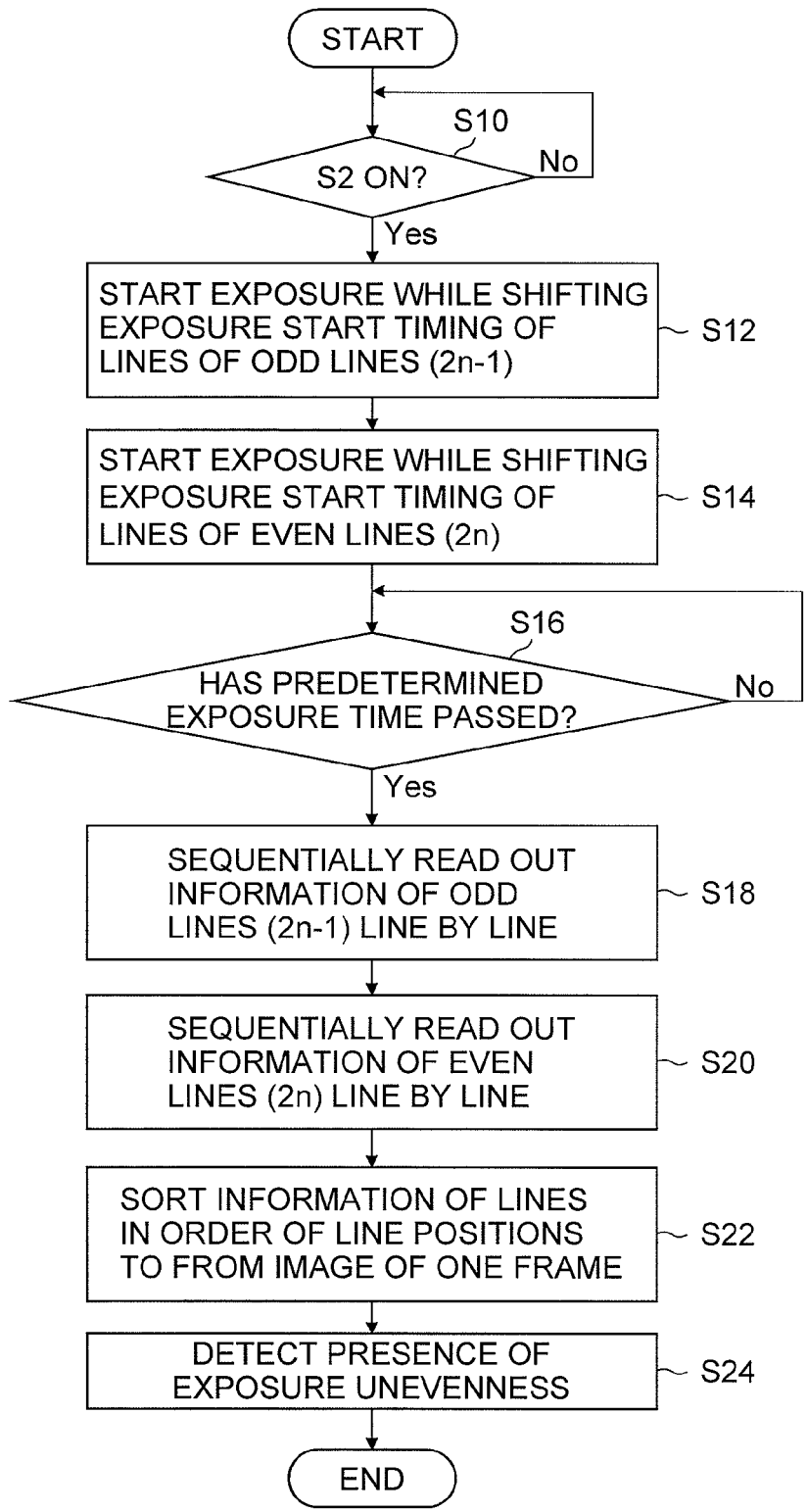
FIG. 2 is a flow chart showing a first embodiment of an imaging control method according to the present invention.
Figure 26:
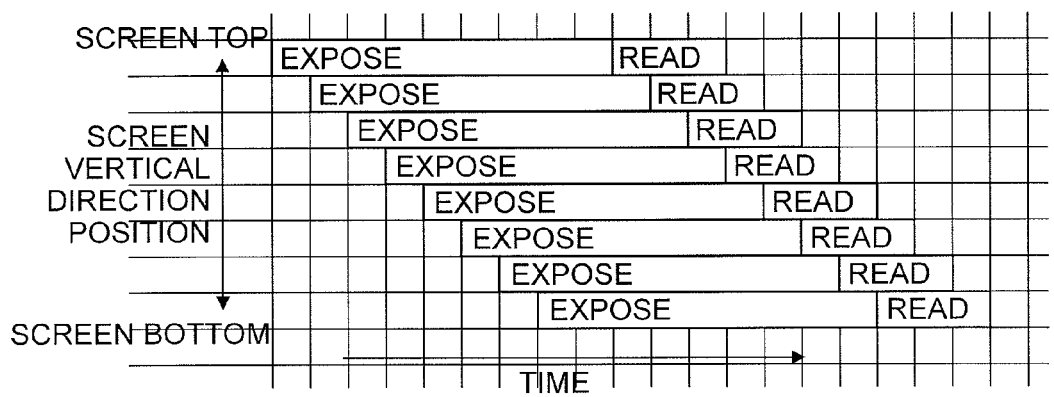
FIG. 26 is a timing chart showing conventional exposure/read timing in a rolling shutter system.
Figure 27:
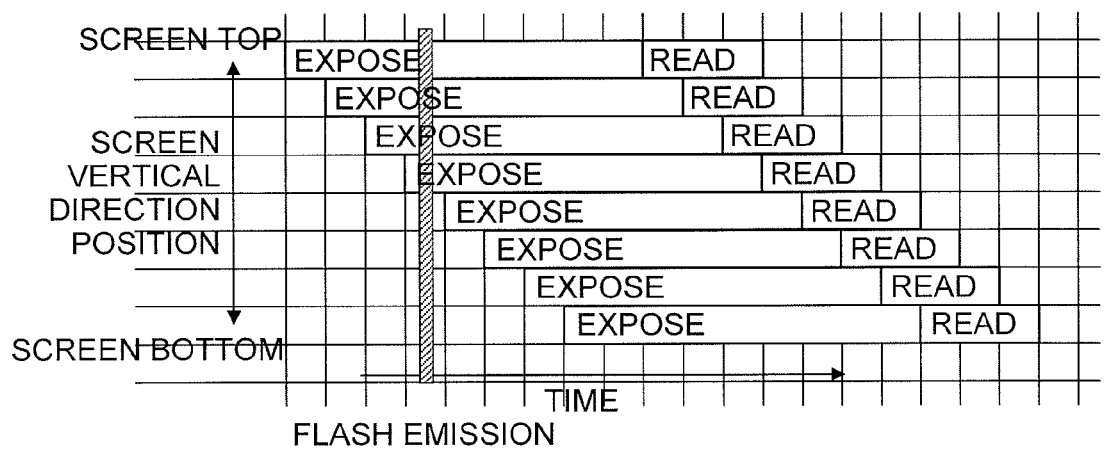
FIG. 27 is a timing chart showing conventional exposure/read timing in the rolling shutter system and is a diagram showing a state in which flashlight of a camera of another person has entered.
Figure 28:
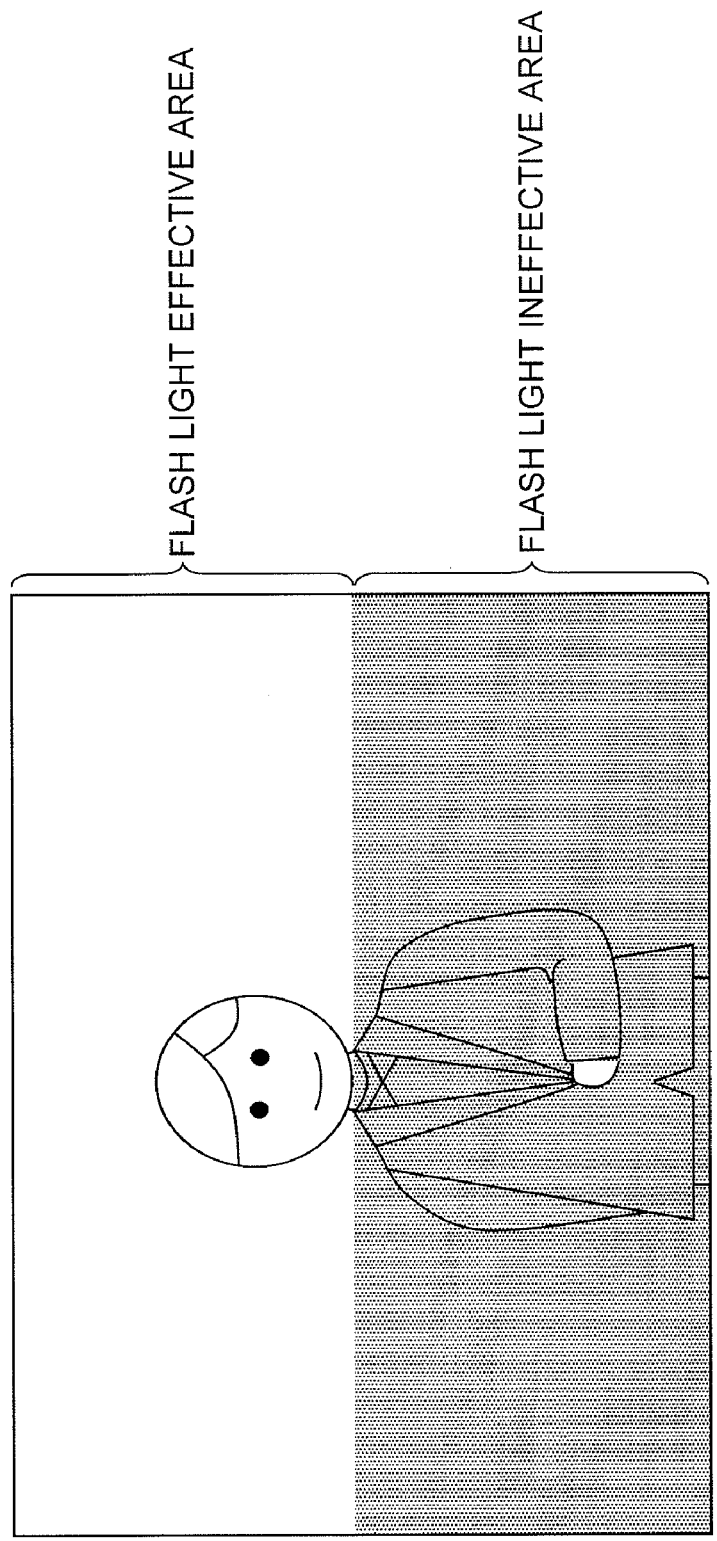
FIG. 28 is a diagram showing a conventional image of a main image with exposure unevenness.

In a first embodiment of the present invention described below, the CMOS image sensor 26 does not sequentially scan the read-out lines from the top line to the last line as shown in FIG. 26. The CMOS image sensor 26 first scans odd lines among all lines and then scans even lines as shown in FIG. 2. As a result, the read timing of the adjacent odd lines and even lines is significantly shifted, and the exposure start timing is also significantly shifted.

The AGC (Automatic Gain Control) circuit 30 amplifies the image signal outputted from the CMOS image sensor 26 with a gain according to the imaging sensitivity set by the CPU 10 and outputs the signal to the A/D converter 32.

The A/D converter 32 converts an analog signal outputted from the AGC circuit 30 into, for example, a 12-bit digital signal and outputs the digital signal. The digital signal outputted from the A/D converter 32 is transmitted to the image signal processing circuit 34.

The image signal processing circuit 34 comprises a synchronization circuit (processing circuit that interpolates spatial deviation of color signals associated with the color filter alignment of a single-plate CMOS image sensor), a white balance correction circuit, a gamma correction circuit, a contour correction circuit, a luminance/color difference signal generation circuit (YC circuit), etc. The image signal processing circuit 34 applies required signal processing to an inputted image signal in accordance with a command from the CPU 10 and generates image data (YUV data) formed by luminance data (Y data) and color difference data (Cr, Cb data).

The compression/decompression processing circuit 36 applies a compression process in a predetermined format to the inputted image data in accordance with a command from the CPU 10 and generates compressed image data. The compression/decompression processing circuit 36 also applies a decompression process in a predetermined format to the inputted compressed image data in accordance with a command from the CPU 10 and generates uncompressed image data.

The LCD driver 38 applies predetermined signal processing to the image signal generated by the image signal processing circuit 34 and held in the VRAM 18 to generate a signal for image display and outputs the signal to the LCD 40 at certain timing.

The LCD 40 is constituted by a liquid crystal display capable of color display, is used as an image display device for displaying photographed images during the reproduction mode, and is used as a user interface in various setting operations. Live preview images are displayed during the imaging mode, and the LCD 40 is used as an electronic finder for checking the angle of view.

The AE/WB detection circuit 42 divides one screen into a plurality of areas (for example 16×16) as physical values necessary for the AE control and calculates an integrated value of R, G, and B image signals for each divided area (hereinafter, called "photometric divided area"). The calculated values are outputted to the image signal processing circuit 34 and used by a white balance correction circuit in the image signal processing circuit 34.

The AF detection circuit 43 usually calculates an integrated value (AF evaluation value) that is obtained by integrating absolute values of high-frequency components of a signal in a predetermined AF area (for example, screen center) and that indicates the contrast of an image in the AF area. In the present embodiments, the AF detection circuit 43 calculates AF evaluation values of a plurality of areas, in the same way as for the photometric divided areas. The CPU 10 imports the AF evaluation values calculated by the AF detection circuit 43 and moves the focus lens incorporated into the imaging lens 22a through the focus mechanism to make the AF evaluation values of the AF areas maximum to adjust the focus.

The media controller 46 controls reading/writing of data to and from the non-volatile memory card 44 such as a flash memory loaded on a media slot.

Actions of the digital camera 1 configured this way will be described.

[First Embodiment (Detection of Exposure Unevenness)]

FIG. 2 is a flow chart showing the first embodiment of the imaging control method according to the present invention and mainly shows a procedure from the start of imaging of a main image to the detection of exposure unevenness.

When the shutter release button is full-pressed (S2 ON), and imaging for recording is instructed to the CPU 10, the CPU 10 controls the aperture device 22b and an electronic shutter, controls the exposure for main imaging, and performs rolling reading of image signals from the CMOS image sensor 26 (steps S10 to S20).

Figure 3A:
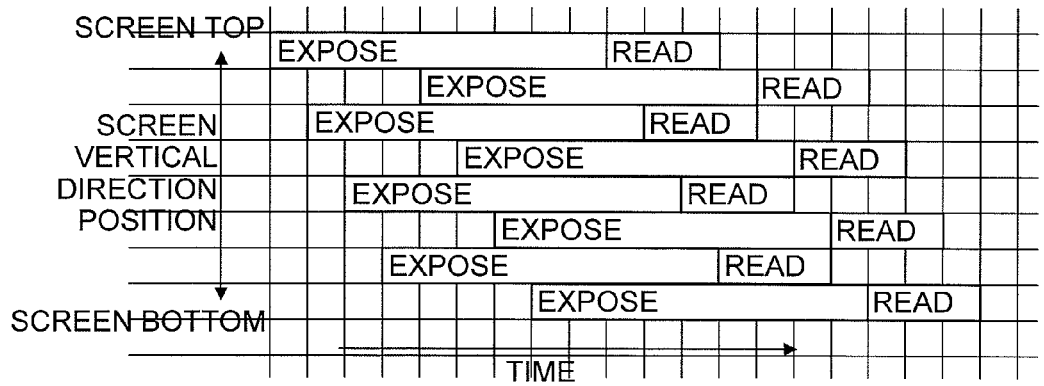
FIGS. 3A and 3B are timing charts used to explain control of exposure/read-out lines according to the present invention.
Figure 3B:
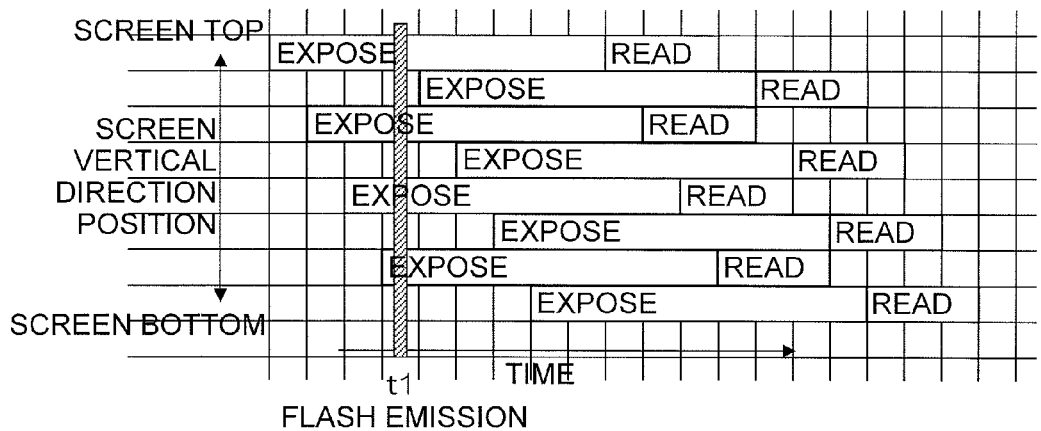

As shown in FIGS. 3A and 3B, in the exposure control for main imaging, the exposure is started while shifting the exposure start timing by sequentially resetting the odd lines (2n-1) (n=1, 2, 3, . . . ) among all lines of the CMOS image sensor 26 (step S12), and then the exposure is started while shifting the exposure start timing by sequentially resetting the even lines (2n) (n=1, 2, 3, . . . ) (step S14).

Whether a predetermined exposure time from the start of exposure of the top line (first line) has passed is determined (step S16). If the predetermined exposure time has passed (case of "Yes"), information (voltage signal equivalent to the charge accumulated in each pixel) of the odd lines (2n-1) of the CMOS image sensor 26 is sequentially read out line by line (step S18), and then information of even lines (2n) is sequentially read out line by line (step S20). The read timing of the information of the lines is also shifted as with the exposure start timing. As a result, the exposure time of the lines is designed to be a predetermined exposure time (constant).

When reading of the information of all lines of the CMOS image sensor 26 is finished, the CPU 10 sorts the information of the read-out lines in order of line positions (order from the top line to the last line) to form an image (main image) of one frame (step S22).

The information of the lines may be sorted all together after the completion of reading of all lines, or the information may be sorted by controlling the storage location when the information is read out line by line from the CMOS image sensor 26 and temporarily stored in the RAM 14.

The CPU 10 detects the presence of exposure unevenness caused by flash emission of another person, etc. during imaging of the main image from the acquired main image (step S24).

The detection method of the presence of exposure unevenness in the main image will be described.

Figure 4:
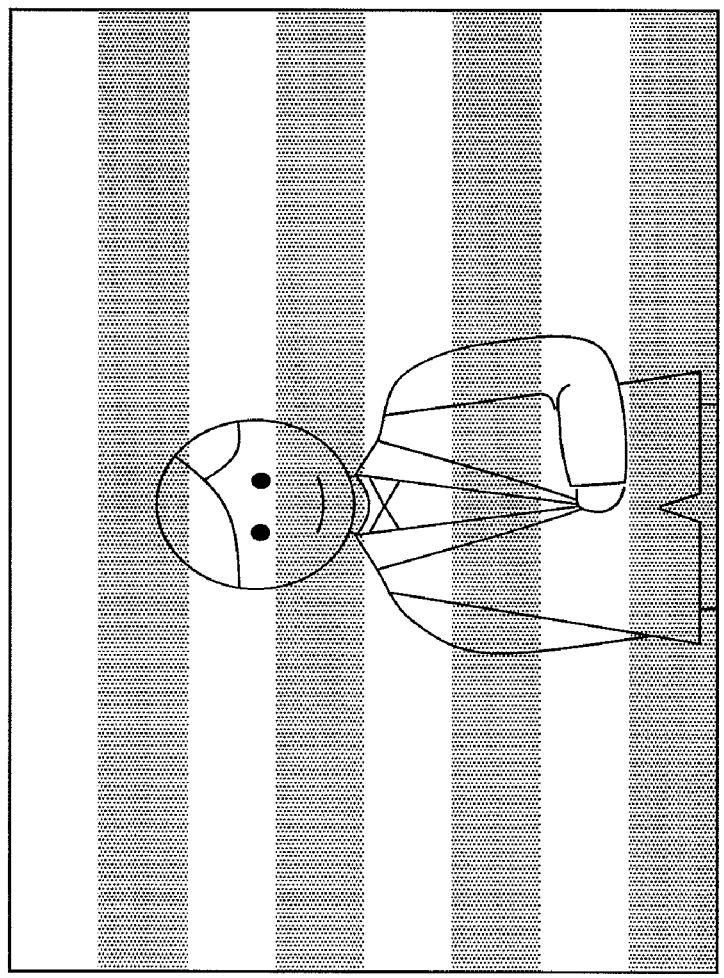
FIG. 4 is a diagram showing an image of a main image with exposure unevenness caused by flash emission of a camera of another person.

FIG. 3B shows a case in which flashlight enters at a time t1 during the main imaging. FIG. 4 is a diagram conceptually showing the main image with exposure unevenness due to the flashlight.

In the example shown in FIG. 3B, the flashlight enters only in the odd lines during the exposure period of the main image. Therefore, as shown in FIG. 4, the luminance of the odd lines of the main image is higher than the luminance of the even lines, and there is stripe exposure unevenness in the main image in which light and dark are repeated line by line.

In the present invention, it is determined that there is exposure unevenness caused by flash emission of another person, etc. when there is a stripe luminance difference as described above in the main image.

For example, when the average luminance of each line is obtained from the information (luminance information after synchronization of RGB signal and YC processing) of each line of the main image, the average luminance of the odd lines (Odd) and the even lines (Even) repeats light and dark as shown in FIG. 5A. Therefore, exposure unevenness can be detected based on the change in the average luminance.

In the embodiment, the read-out lines (exposure start lines by reset) are controlled to significantly shift the exposure start timing (about one half of a time difference between the first exposure start timing and the last exposure start timing of one frame) line by line (between odd lines and even lines). However, the arrangement is not limited to this, and the read-out lines may be controlled to significantly shift the exposure start timing of adjacent lines every N-th line (N: integer 2 or greater).

For example, if the read-out lines are controlled to significantly shift the exposure start timing every fifth line, and the flashlight enters during the exposure period of the main image, light and dark are repeated every fifth line as shown in FIG. 5B. Therefore, the exposure unevenness can be detected based on the change in the average luminance.

The resolution in the method of reading the exposure by setting the time difference every plurality of lines is inferior to that in the method of setting the time difference by odd/even lines. However, it is advantageous that the calculation areas can be reduced, a system with low calculation capacity can be easily handled, and the calculation time can be reduced if the calculation capacities are the same.

The stripe exposure unevenness has a cycle corresponding to the number of lines (interval of every line or every N-th line) with significantly shifted exposure start timing. Therefore, the CPU 10 can calculate the cycle of the exposure unevenness and determine the presence of the exposure unevenness from the cycle to perform more accurate determination of exposure unevenness.

The stripe exposure unevenness may occur not only on the entire screen, but also only on the upper part of the screen or the lower part of the screen, depending on the incident timing of the flashlight of another person during the exposure period of the main image. However, the exposure unevenness can be excellently detected even in that case. Although the exposure unevenness does not occur when the flashlight of another person enters all lines, this may result in the excessive exposure.

Figure 6A:
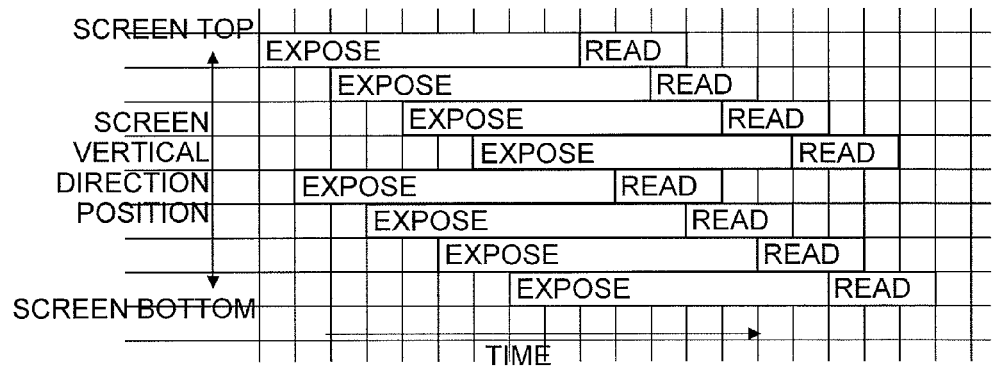
FIGS. 6A and 6B are diagrams showing another example of controlling the read-out lines to significantly shift exposure start timing.
Figure 6B:
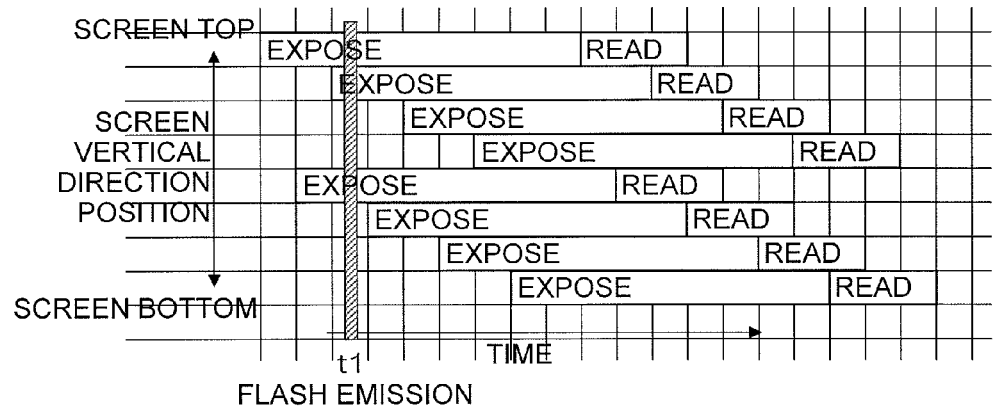

FIGS. 6A and 6B are diagrams showing another example of controlling the read-out lines to significantly shift the exposure start timing.

In the example shown in FIGS. 6A and 6B, the read-out lines are controlled so that the exposure start timing of adjacent lines is significantly shifted every fourth line. The exposure start timing between four lines is also significantly shifted compared to the amount of shift of the general exposure start timing shown in FIG. 20.

FIG. 7A is a diagram showing another example of controlling the read-out lines to significantly shift the exposure start timing.

In the example shown in FIG. 7A, among (3n-2) lines (n=1, 2, 3 . . . ), (3n-1) lines, and 3n lines of the CMOS image sensor 26, information of the (3n-2) lines and the 3n lines are read first, and information of the (3n-1) lines is read later to significantly shift the exposure start timing of the (3n-1) lines from that of the (3n-2) lines and the 3n lines before and after the (3n-1) lines.

When the flashlight of another person enters at the time t1 during the exposure period of the main image shown in FIG. 7A, the luminance of the (3n-2) lines and the 3n lines among all lines of the CMOS image sensor 26 is greater than the luminance of the (3n-1) lines, and stripe exposure unevenness as shown in FIG. 7B is generated.

The order of reading the lines is not limited to the case in which the information of the (3n-2) lines and the 3n lines is read first, and the information of the (3n-1) lines is read later as shown in FIG. 7A. The information of the (3n-1) lines may be read first, and the information of the (3n-2) lines and the 3n lines may be read later. However, the former has an advantage that the exposure start timing of adjacent lines can be significantly shifted.

Figure 8:
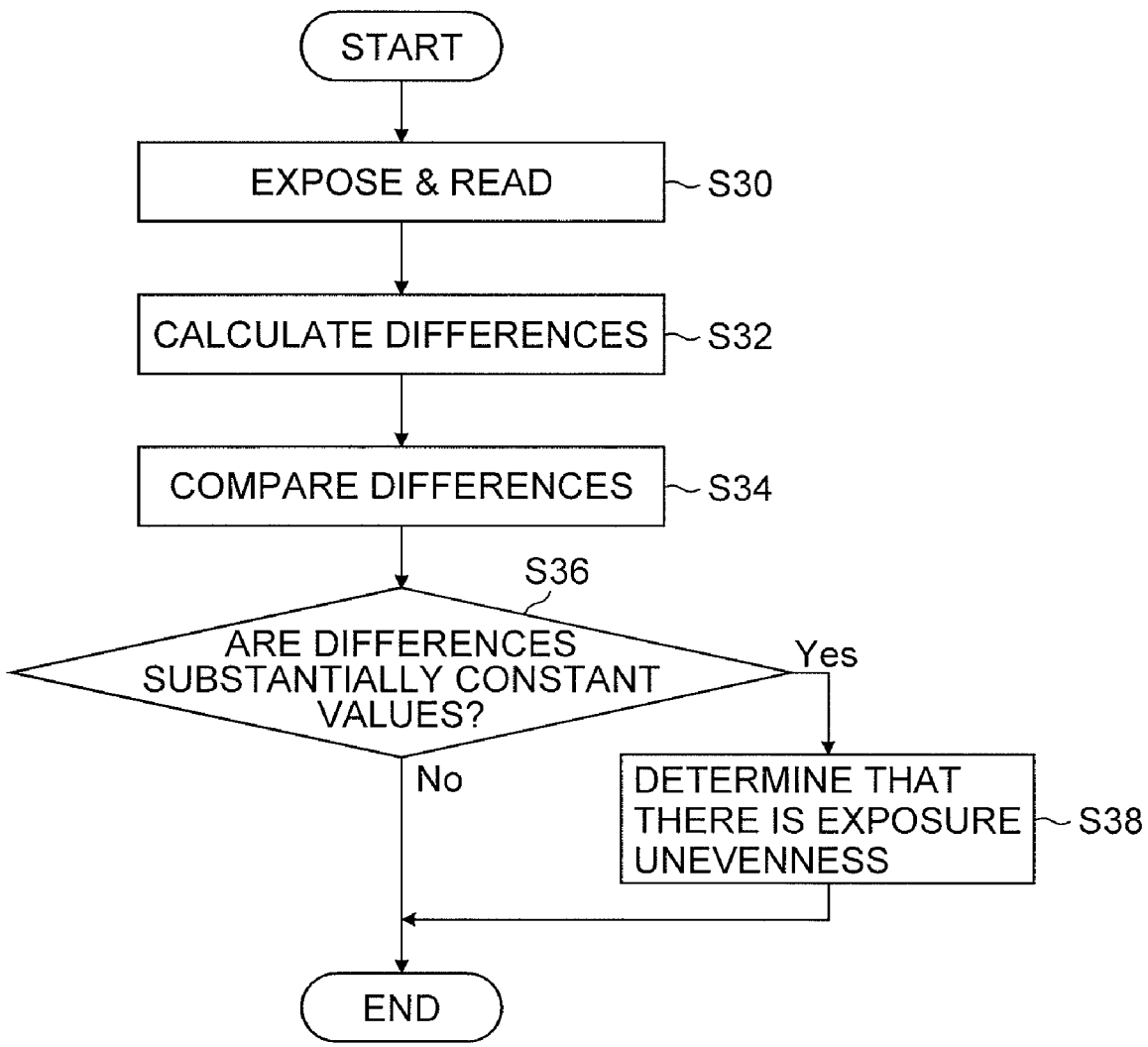
FIG. 8 is a flow chart used to explain another example of detecting exposure unevenness.
Figure 9:
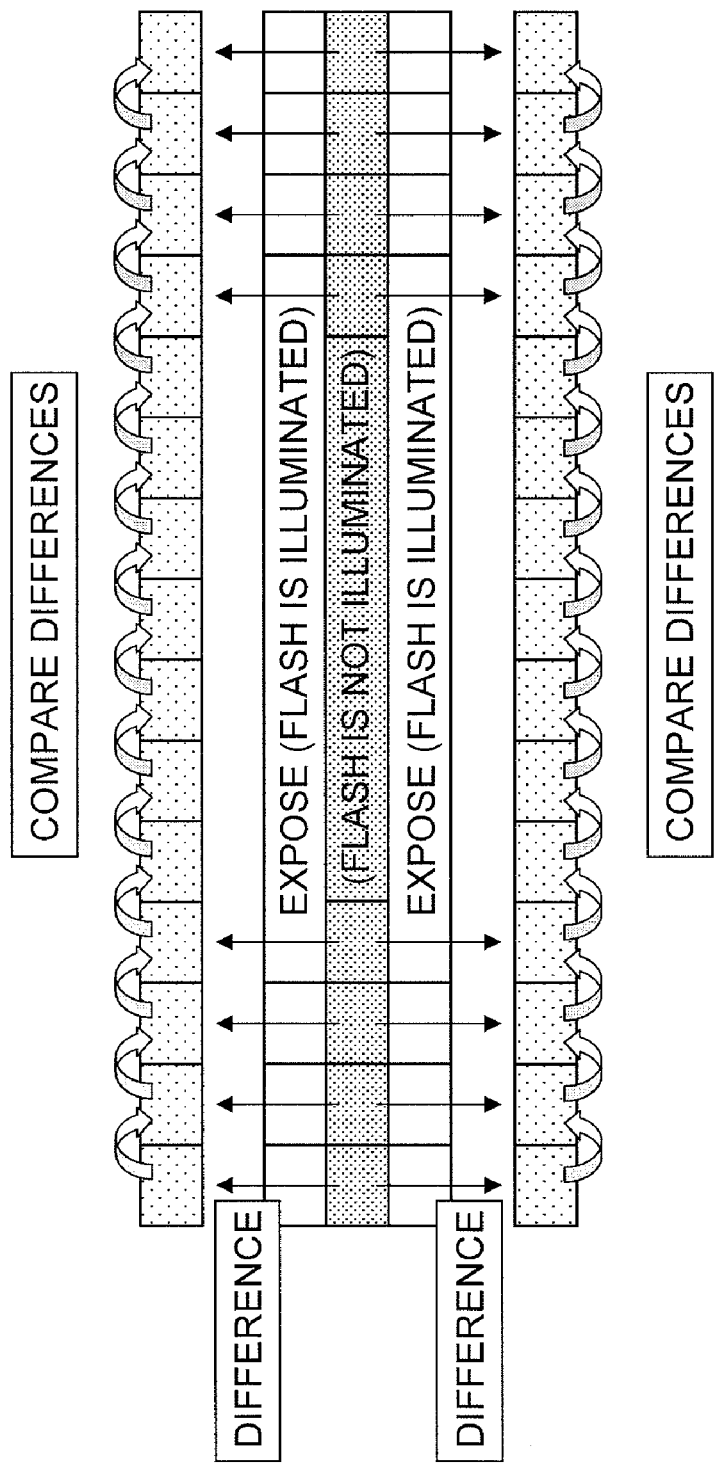
FIG. 9 is a conceptual diagram used to explain another example of detecting exposure unevenness.

FIGS. 8 and 9 are diagrams showing another example of detecting exposure unevenness.

As shown in FIG. 8, the main image is acquired by exposure and reading as described above (step S30). Subsequently, as shown in FIG. 9, differences in image signals of the pixels of adjacent lines ((3n-2) lines and (3n-1) lines as well as (3n-1) lines and 3n lines) of the main image are calculated (step S32), and adjacent differences are further compared (step S34).

Whether there are substantially constant differences (luminance differences) throughout the entire lines is determined from the comparison result (step S36). If there are substantially constant luminance differences throughout the entire lines (case of "Yes"), it is determined that there is exposure unevenness (step S38).

[Second Embodiment (Warning of Exposure Unevenness)]

If it is determined in the process of step S24 that there is exposure unevenness in the main image, the CPU 10 issues a warning of exposure unevenness.

For the warning of exposure unevenness, for example, a photographed image is displayed on the LCD 40 on the back face of the digital camera 1, and a message, such as "Exposure Unevenness!", is displayed on the screen of the LCD 40.

When the warning of exposure unevenness is issued, the photographer checks on the screen of the LCD 40 whether the exposure unevenness has actually occurred. If the detection of the exposure unevenness is a false detection, recording is instructed if the exposure unevenness can be permitted, and a cancel instruction for canceling the recording process of image is issued if the exposure unevenness cannot be permitted. The recording instruction can be issued by pressing the menu/OK key of the operation unit 12, and the cancel instruction can be issued by pressing the BACK key of the operation unit 12. The key operation methods are displayed on the screen of the LCD 40.

If it is determined in step S24 that there is no exposure unevenness in the main image, and if the recording instruction is issued, a compression process of the taken image temporarily stored in the RAM 14 and a recording process, such as recording to the memory card 44, are executed.

The warning of exposure unevenness allows the photographer to retake an image, and only images without exposure unevenness or images with allowable exposure unevenness can be recorded.

In the embodiment, the photographer can select recording/canceling of an image when there is a warning of exposure unevenness. However, the arrangement is not limited to this, and the image may be unconditionally recorded.

[Third Embodiment (Correction of Exposure Unevenness)]

Figure 10:
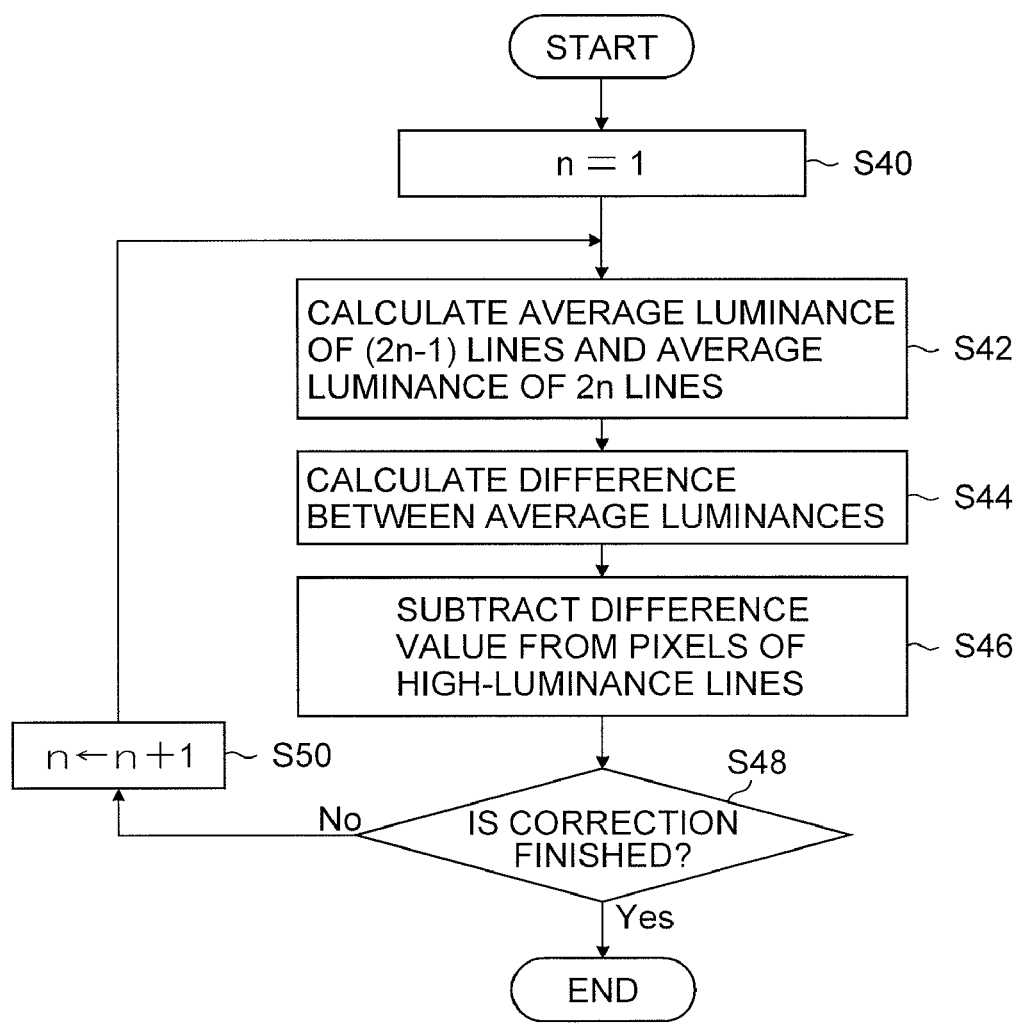
FIG. 10 is a flow chart showing a third embodiment of the imaging control method according to the present invention.

FIG. 10 is a flow chart showing a third embodiment of the imaging control method according to the present invention. FIG. 10 particularly illustrates a method of removing exposure unevenness of a main image when the exposure unevenness is detected from the main image obtained by setting a time difference in the odd/even lines shown in FIGS. 3A and 3B to expose and read the lines.

The CPU 10 first sets n=1 as an initial value of lines of the main image to be processed (step S40).

The average luminance of pixels of (2n-1) lines (odd lines) and the average luminance of pixels of 2n lines (even lines) are calculated (step S42), and the difference between the average luminances is calculated (step S44).

The difference value calculated in step S44 is subtracted from the pixels of high-luminance lines among the odd/even lines (step S46). In this way, the luminance is corrected in the pixels of the bright lines with high luminance caused by the flash emission of a camera of another person.

Whether the correction of the pixels of all lines up to the last line of the main image has finished is then determined (step S48). If the correction is not finished, n is incremented by 1 (step S50), the process moves to step S42, and the pixels are corrected in the following odd/even lines.

The correction of the luminance of high-luminance pixels based on the average luminance differences of pixels between the adjacent lines allows excellent correction of the in-plane exposure unevenness.

[Fourth Embodiment (Correction of Exposure Unevenness)]

Figure 11:
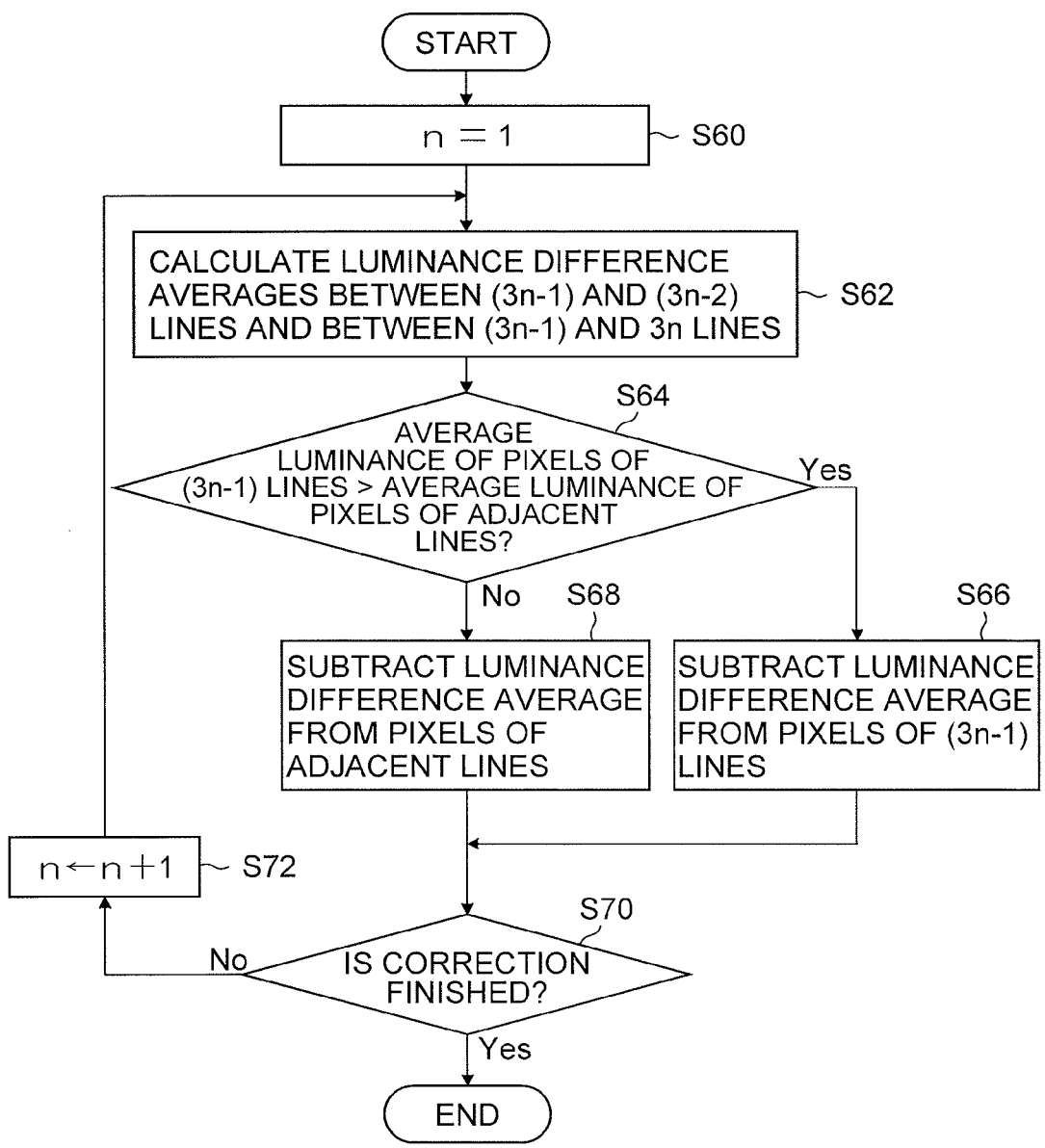
FIG. 11 is a flow chart showing a fourth embodiment of the imaging control method according to the present invention.

FIG. 11 is a flow chart showing a fourth embodiment of the imaging control method according to the present invention. FIG. 11 particularly illustrates a method of removing exposure unevenness of a main image when the exposure unevenness is detected from the main image obtained by arranging the time differences between the (3n-1) lines and the lines before and after the (3n-1) lines ((3n-2) lines and 3n lines) shown in FIG. 7 to expose and read the lines.

The CPU 10 first sets n=1 as an initial value of the lines of the main image to be processed (step S60).

Subsequently, an average A1 (luminance difference average) of the luminance differences of pixels in the entire lines of the (3n-1) lines as well as the (3n-2) lines and an average A2 (luminance difference average) of the luminance differences of pixels in the entire lines of the (3n-1) lines and the 3n lines are calculated (step S62). Since the differences between the image signals of the pixels of adjacent lines ((3n-2) lines and (3n-1) lines as well as (3n-1) lines and 3n lines) of the main image are obtained in step S32 of FIG. 8, the luminance difference average can be calculated by obtaining the averages of the entire lines of the differences.

Whether the average luminance of the pixels of the (3n-1) lines is greater than the average luminance of the pixels of the adjacent lines ((3n-2) lines and 3n lines) is compared (step S64). If the average luminance of the pixels of the (3n-1) lines is greater (case of "Yes"), the luminance difference average calculated in step S62 is subtracted from the pixels of the (3n-1) lines (step S66). In step S66, both "subtracting the average A1 from the pixels of the (3n-1) lines" and "subtracting the average A2 from the pixels of the (3n-1) lines" can be adopted. Additionally, "subtracting an average of the averages A1 and A2 from the pixels of the (3n-1) lines" can also be adopted. On the other hand, if the average luminance of the pixels of the (3n-1) lines is smaller (case of "No"), the luminance difference average (A1, A2) calculated in step S62 is subtracted from the pixels of the adjacent lines (step S68). In step S68, both (3n-2) lines and 3n lines are subject to subtraction. That is, in step S68, the above A1 is subtracted from the pixels of (3n-2) lines when the (3n-2) lines are corrected, and the A2 is subtracted from the pixels of 3n lines when the 3n lines are corrected. In this way, the luminance of the pixels of the (3n-1) lines, in which the luminance is high due to flash emission of a camera of another person, or the luminance of the pixels of the lines adjacent to the (3n-1) lines is corrected.

Whether the correction of the pixels of all lines up to the last line of the main image has finished is then determined (step S70). If the correction is not finished, n is incremented by 1 (step S72). The process moves to step S62, and the pixels are corrected in the following consecutive three lines.

The correction of the luminance of high-luminance pixels based on the average luminance difference of the pixels between adjacent lines allows excellent correction of the in-plane exposure unevenness.

According to the correction of exposure unevenness of the third and fourth embodiments, the lines read in the first half and the lines read in the second half are always adjacent, and the exposure unevenness can be accurately corrected. Therefore, the correction is advantageous in scanning by skipping a plurality of lines or in a method of sorting the order of reading by the ratio of 3:1 or more.

[Fifth Embodiment (Correction of Exposure Unevenness)]

FIG. 12A illustrates occurrence of exposure unevenness in a band shape (and in a stripe pattern) on the screen center due to a flash of another device.

If RGB conversion is performed after simply subtracting the average luminance difference from the exposure unevenness of the image as in the embodiment shown in FIG. 11, there is color deviation between the exposure unevenness generation area and other areas as shown in FIG. 12B when the color temperatures of the ambient light and the flashlight are different.

Figure 13:
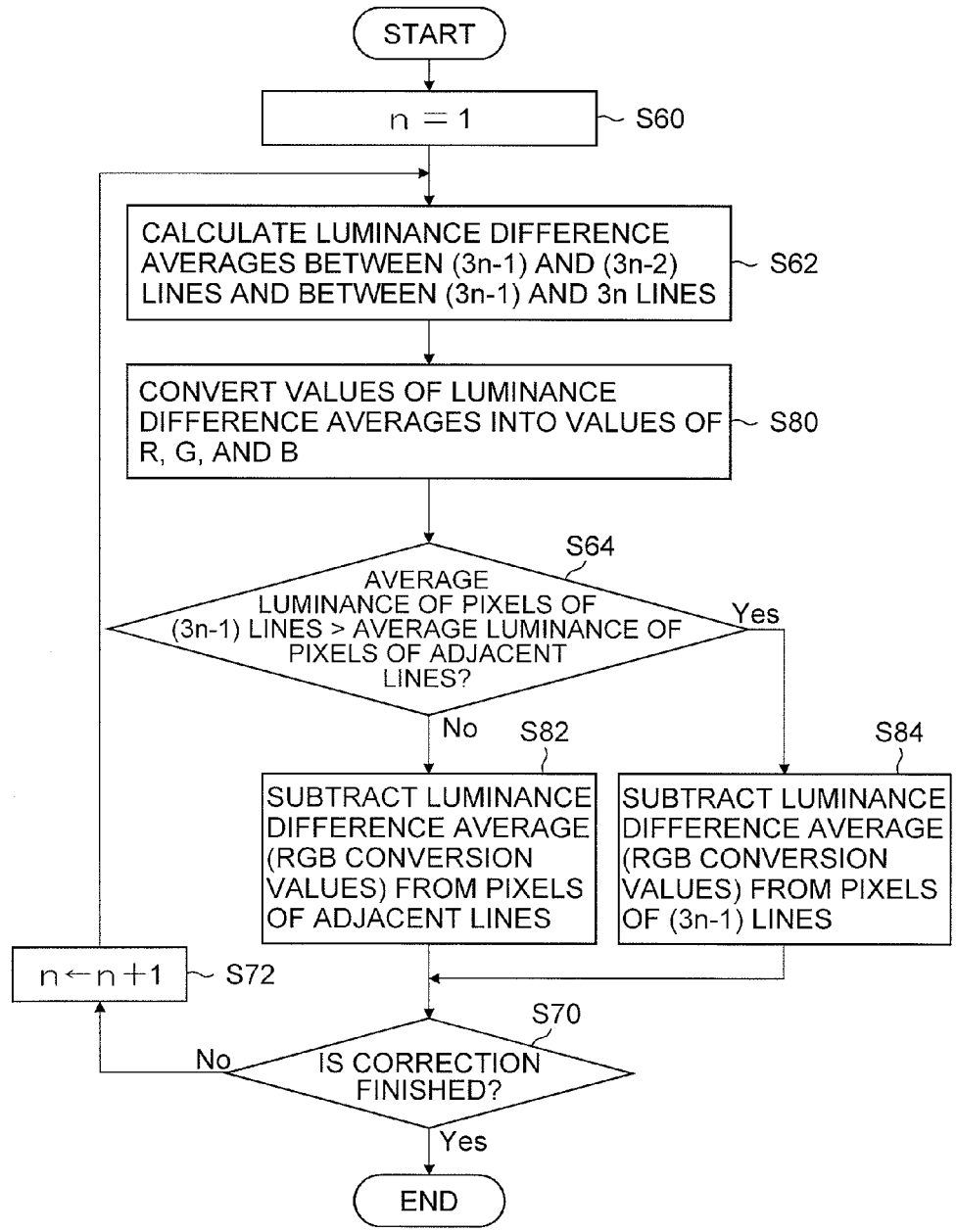
FIG. 13 is a flow chart showing a fifth embodiment of the imaging control method according to the present invention.

FIG. 13 is a flow chart showing a fifth embodiment of the imaging control method according to the present invention. The fifth embodiment is a modified embodiment of the fourth embodiment shown in FIG. 11. Therefore, processes common to the process of the flow chart shown in FIG. 11 are designated with the same step numbers, and the detailed description will not be repeated.

In the fifth embodiment, after the calculation of the luminance difference average (A1, A2) in step S62, the value of the calculated luminance difference average (A1, A2) is converted into a value (A1', A2') of RGB in step S80. The color temperature of the flashlight is about 5000 to 6000K, and the value is converted by ratio of RGB corresponding to the color temperature (R:G:B=0.7:1:0.8).

Subsequently, in steps S82 and S84 for correcting the luminance, the information obtained by applying RGB conversion to the luminance difference average value is subtracted from the high-luminance pixels to correct the exposure unevenness. In step S84, both "subtracting the A1' from the pixels of the (3n-1) lines" and "subtracting the A2' from the pixels of the (3n-1) lines" can be adopted as in step S66. Additionally, "subtracting an average of the averages A1' and A2' from the pixels of the (3n-1) lines" can also be adopted. In step S82, both (3n-2) lines and 3n lines are subject to subtraction as in step S68. That is, in step S68, the above A1' is subtracted from the pixels of (3n-2) lines when the (3n-2) lines are corrected, and the A2' is subtracted from the pixels of 3n lines when the 3n lines are corrected.

As a result, the luminance correction corresponding to the color components of the flashlight is performed, and as shown in FIG. 12C, an image without color deviation in the exposure unevenness generation area and other areas can be obtained.

Figure 14:
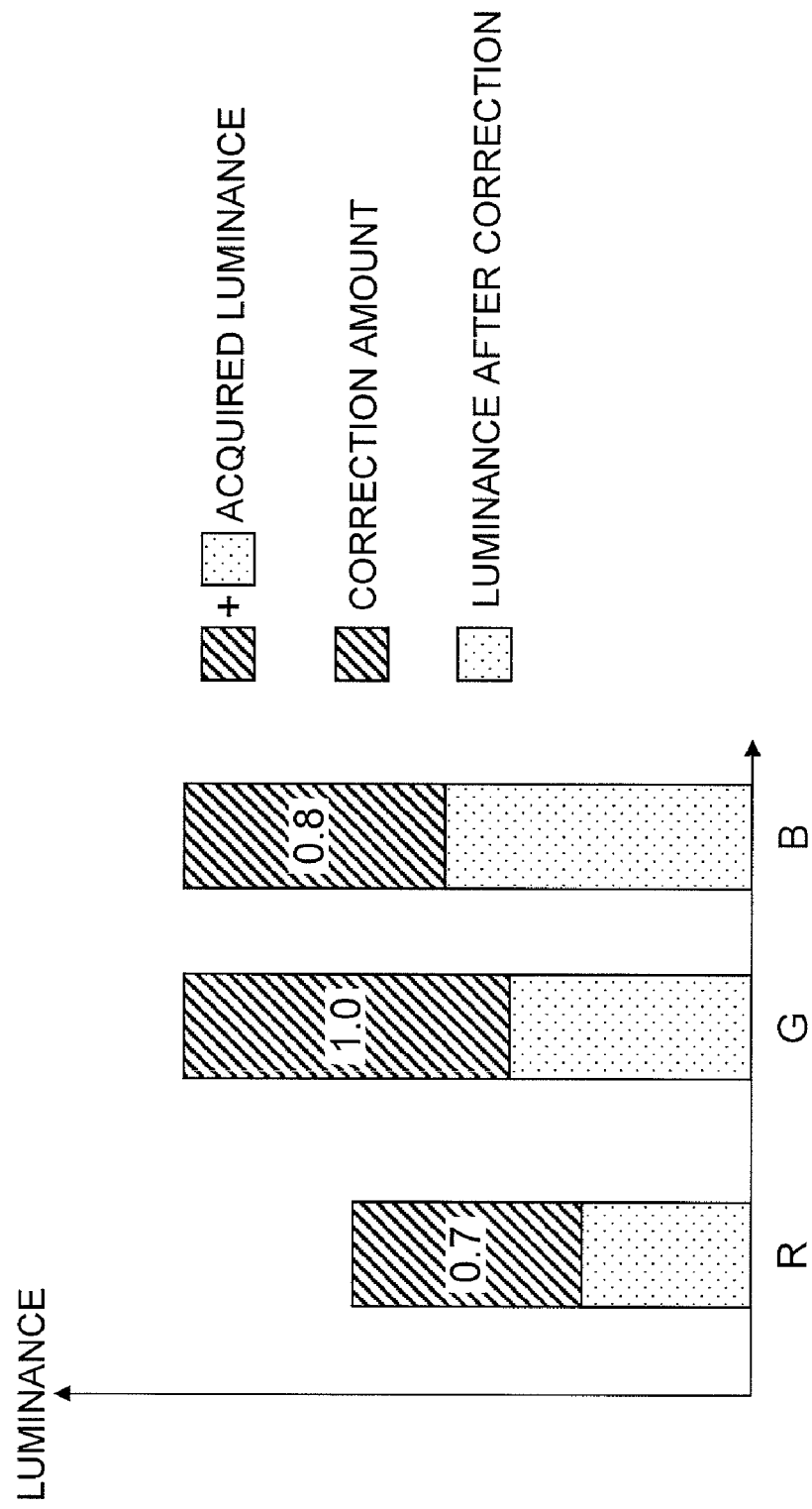
FIG. 14 is a graph showing a correction of exposure unevenness without generating color deviation.

FIG. 14 shows the correction calculation by a graph. The sum of the oblique line part and the halftone dot part of the graph denotes "acquired luminance" at the exposure unevenness part. The "correction amount" obtained by converting the luminance difference average value by ratio of R:G:B=0.7:1:0.8 is equivalent to the oblique line part. The value of the halftone dot part obtained by subtracting the value of the oblique line part from the acquired luminance denotes "luminance after correction" in which hue of the flashlight is removed.

In this way, performing the luminance correction based on the RGB balance equivalent to the color components of the flashlight allows luminance correction without color deviation.

[Sixth Embodiment]

The principle of a sixth embodiment of the present invention will be described.

Figure 15:
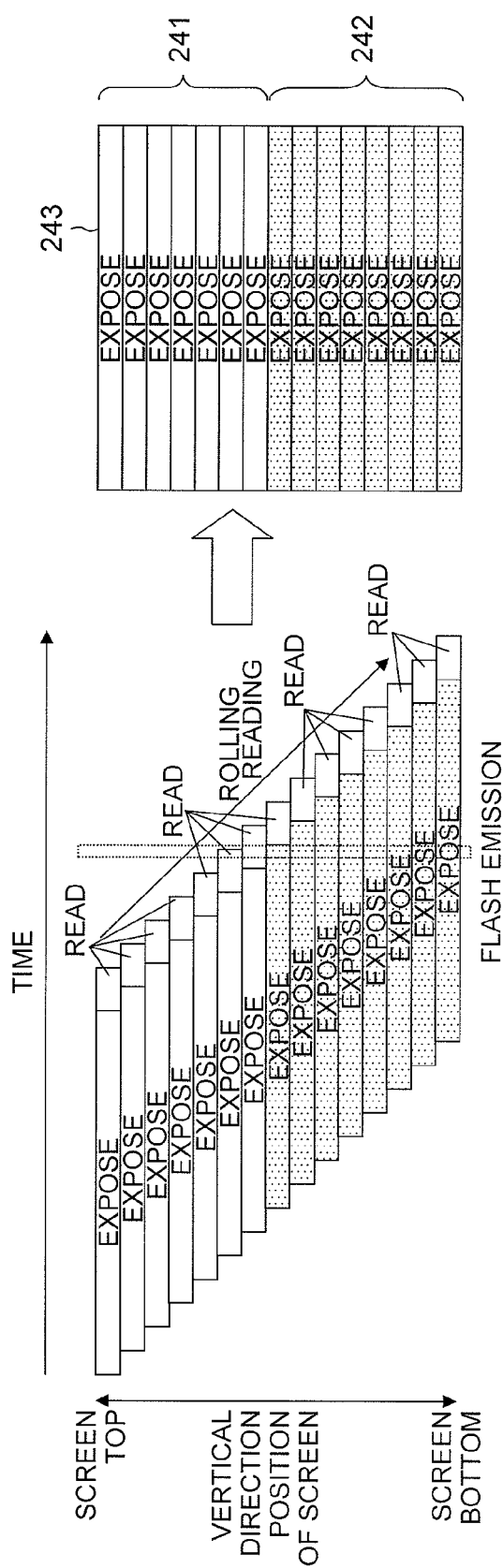
FIG. 15 is a diagram showing exposure of a photographic image when there is a short-time light intensity change.

As shown in FIG. 15, when an image is taken by a rolling shutter system in which the exposure is started by shifting the exposure start timing in each line, and information on the lines is sequentially read from the lines in which predetermined exposure time has passed, an image 243 is divided into a normal luminance part 241 and a high-luminance part 242 by dividing the lines into lines without emission of flashlight during the exposure period of a plurality of lines and lines with emission of flashlight during the exposure period.

Figure 16:
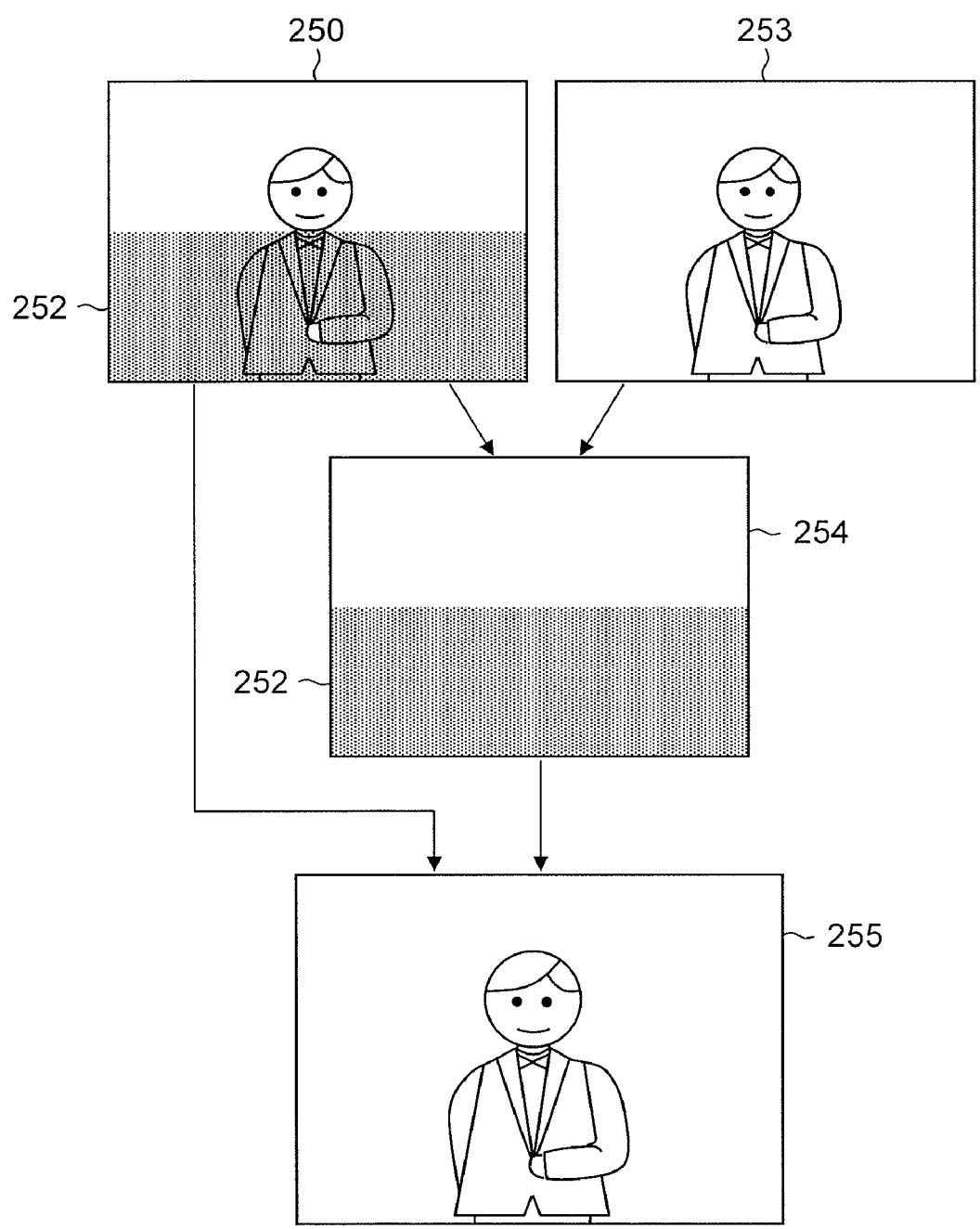
FIG. 16 is a diagram used to explain a principle of the present invention.

In the sixth embodiment of the present invention, as shown in FIG. 16, a main image 250 (hereinafter, called "photographed image") to be recorded in synchronization with the shutter release operation and an image 253 (hereinafter, called "reference image") without exposure unevenness among the live preview images of a plurality of frames exposed before or after the photographed image are compared. Exposure unevenness is detected based on the luminance difference, and the luminance difference part 252 of the photographed image 250 is corrected based on a luminance difference image 254 to acquire a photographed image 255 in synchronization with the shutter release operation and without exposure unevenness caused by the rolling shutter.

The "live preview image" in the present specification denotes an image exposed before or after the photographed image. The photographer can see the live preview image displayed on a display device, such as the LCD 40, before the shutter release operation to check the imaging range, the focus state, the main object, etc.

An imaging apparatus and an imaging control method according to the sixth embodiment will be described.

Figure 17:
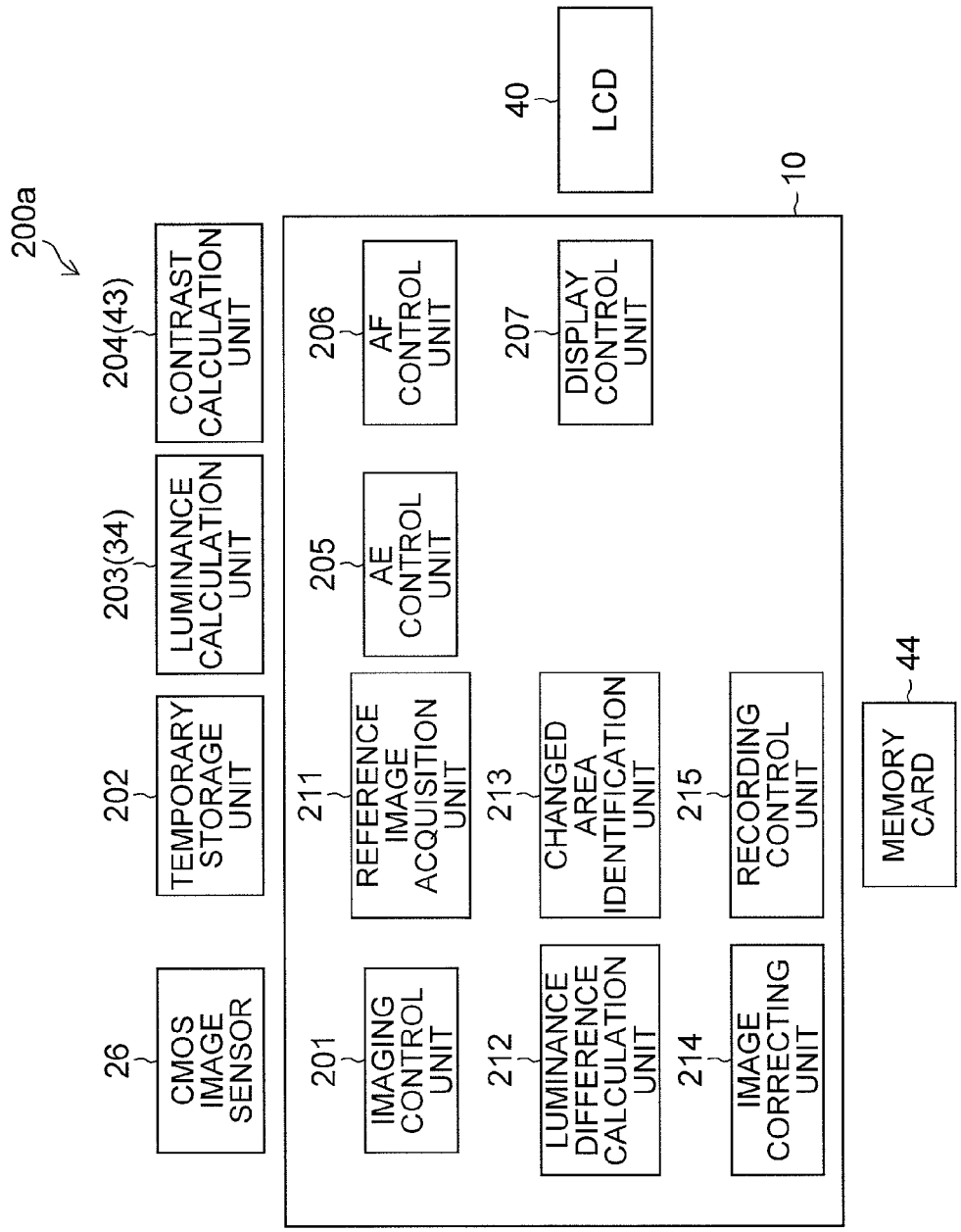
FIG. 17 is a main part functional block diagram of the imaging apparatus according to a sixth embodiment of the present invention.

FIG. 17 is a main part functional block diagram of an imaging apparatus 200a (digital camera 1 of FIG. 1) according to the first embodiment.

An imaging control unit 201 controls the CMOS image sensor 26 to acquire a photographed image to be recorded (main image), which is an image of one frame made of information of a plurality of lines read from the CMOS image sensor 26 and which is synchronized with the shutter release operation, and a live preview image of a plurality of frames exposed before and after the photographed image.

A temporary storage unit 202 temporarily stores the live preview image and the photographed image acquired from the CMOS image sensor 26. In the present example, the RAM 14 of FIG. 1 constitutes the temporary storage unit 202.

A luminance calculation unit 203 calculates the luminance of the live preview image and the photographed image. In the present example, the image signal processing circuit 34 of FIG. 1 constitutes the luminance calculation unit 203, and luminance data (Y data) is generated from an RGB signal obtained by the CMOS image sensor 26.

A contrast calculation unit 204 calculates an AF evaluation value indicating the contrast of the live preview image. In the present example, the AF detection circuit 43 of FIG. 1 constitutes the contrast calculation unit 204.

An AE control unit 205 performs photometry, such as average value photometry and center emphasis photometry, based on the integrated values of image signals in the photometric divided areas detected by the AE/WB detection circuit 42 of FIG. 1 and performs AE (automatic exposure) control based on the photometric values (object luminance).

An AF control unit 206 performs AF (automatic focus) control based on the AF evaluation value calculated by the contrast calculation unit 204.

A reference image acquisition unit 211 acquires a reference image without exposure unevenness from live preview images of a plurality of frames temporarily stored in the temporary storage unit 202. A specific example of the reference image acquisition will be described later.

A luminance difference calculation unit 212 calculates the luminance difference between the photographed image and the reference image of the live preview image. Based on whether the calculated luminance difference is over a predetermined threshold (threshold that can determine a luminance increase caused by irradiation of flashlight of a camera of another person), it can be determined that there is a high-luminance part (exposure unevenness) on the photographed image caused by flashlight.

In the present embodiment, a luminance difference image, which indicates a luminance difference between the photographed image and the reference image, is generated from the luminance data of the photographed image and the luminance data of the reference image of the live preview image generated by the luminance calculation unit 203.

A changed area identification unit 213 identifies luminance changed areas (high-luminance part) from the luminance difference image. In this case, for example, the luminance changed areas are identified by the photometric divided areas.

An image correcting unit 214 corrects the luminance of the luminance changed areas in the photographed image based on the difference from the luminance of the corresponding areas in the reference image.

A recording control unit 215 records the corrected photographed image in the memory card 44.

Figure 18:
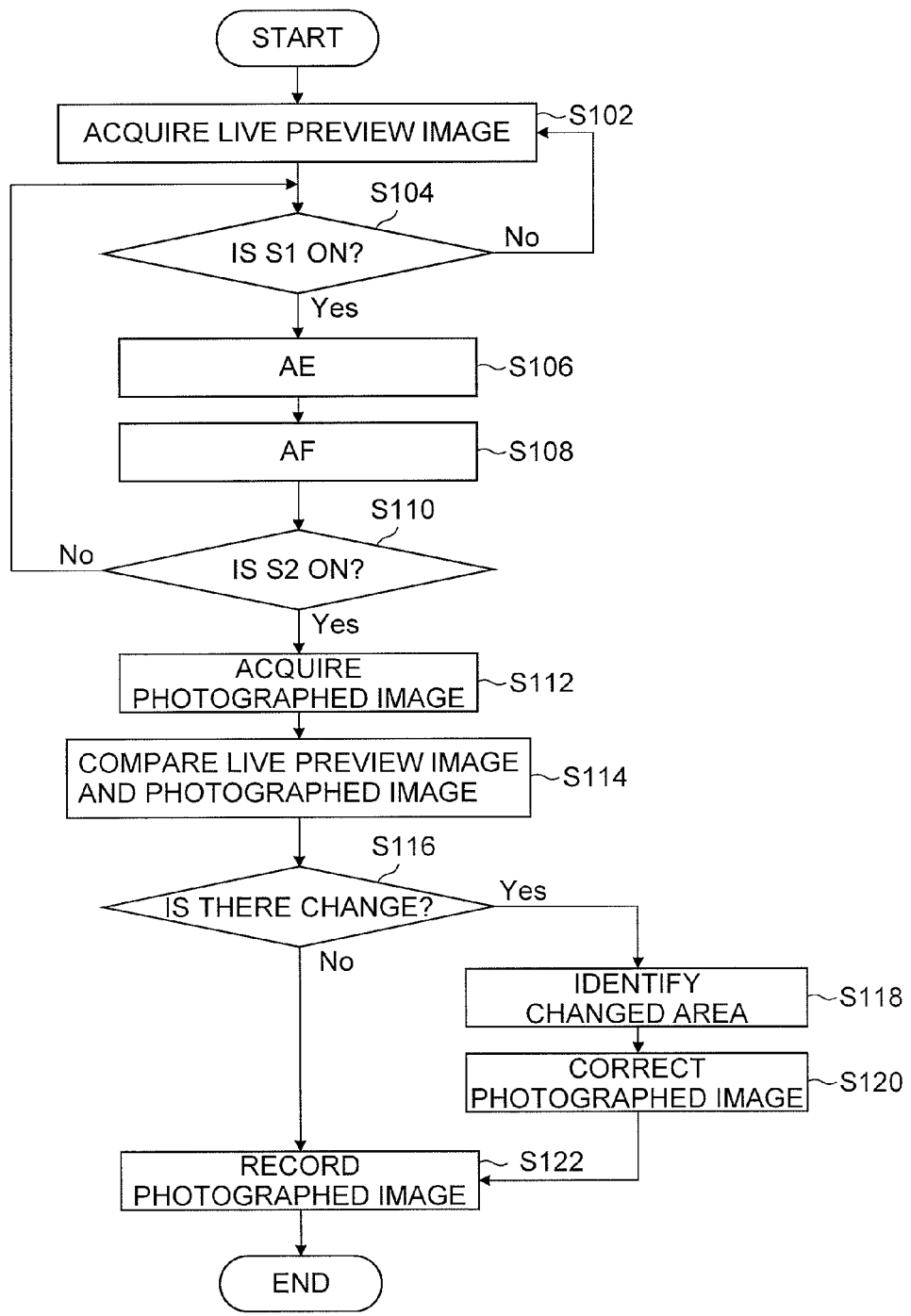
FIG. 18 is a flow chart showing an imaging control process according to the sixth embodiment of the present invention.

FIG. 18 is a flow chart showing an example of a flow of the imaging control process according to the sixth embodiment. The CPU 10 executes the process in accordance with a program.

In step S102, live preview images are acquired. The imaging control unit 201 controls the CMOS image sensor 26 to acquire live preview images made of a plurality of frames and temporarily stores the live preview images in the temporary storage unit 202. The reference image acquisition unit 211 acquires a reference image without exposure unevenness from the live preview images stored in the temporary storage unit 202.

In step S104, whether the shutter release button is half-pressed (S1 ON) is determined. If the shutter release button is half-pressed (S1 ON), the process proceeds to step S106. If the shutter release button is not half-pressed, the process returns to step S102.

The AE control is performed in step S106. The AE control unit 205 acquires the AE evaluation value detected by the AE/WB detection circuit 42 of FIG. 1 and sets the exposure to obtain an appropriate exposure amount. In the example, sensitivity, aperture value, shutter speed, and necessity of flash emission are set.

The AF control is performed in step S108. The AF control unit 206 acquires the AF evaluation value calculated by the contrast calculation unit 204 and searches the position of the focus lens where the AF evaluation value is local maximum to focus the object.

In step S110, whether the shutter release button is full-pressed (S2 ON) is determined. If the shutter release button is full-pressed (S2 ON), the process proceeds to step S112. If the shutter release button is not full-pressed, the process returns to step S104.

A photographed image is acquired in step S112. The imaging control unit 201 controls the CMOS image sensor 26 to acquire the photographed image of one frame and temporarily stores the photographed image in the temporary storage unit 202.

In step S114, the luminance difference calculation unit 212 compares the luminance of the reference image of the live preview images and the luminance of the photographed image. The reference image is an image without exposure unevenness acquired in step S102.

For example, as shown in FIG. 16, the luminance difference image 254 indicating the difference between the luminances of the images is created based on the photographed image 250 and the reference image 253. Specifically, the image signal processing circuit 34 constituting the luminance calculation unit 203 acquires the luminance data of the photographed image and the live preview image from each frame, and the luminance difference calculation unit 212 generates the luminance difference image 254 indicating the difference in the luminance data of the photographed image and the reference image of the live preview images.

In step S116, the presence of a luminance change between the reference image and the photographed image is determined. If there is a luminance change, in other words, if there is a luminance difference part in the photographed image, the process proceeds to step S118. If there is no luminance change, the process proceeds to step S122.

In step S118, the changed area identification unit 213 identifies luminance changed areas (correction target areas) having a luminance difference from the reference image in the photographed image.

In step S120, the image correcting unit 214 corrects the luminance of the luminance changed areas in the photographed image based on the difference from the luminance of the corresponding areas in the reference image.

In this way, a photographed image to be recorded is formed, in which the luminance difference is removed from the luminance changed areas.

In step S122, the recording control unit 215 records the corrected photographed image in the memory card 44. The format of the photographed images is converted if necessary in the recording.

A live preview image acquisition process for improving the reliability of the live preview images will be described.

Figure 19:
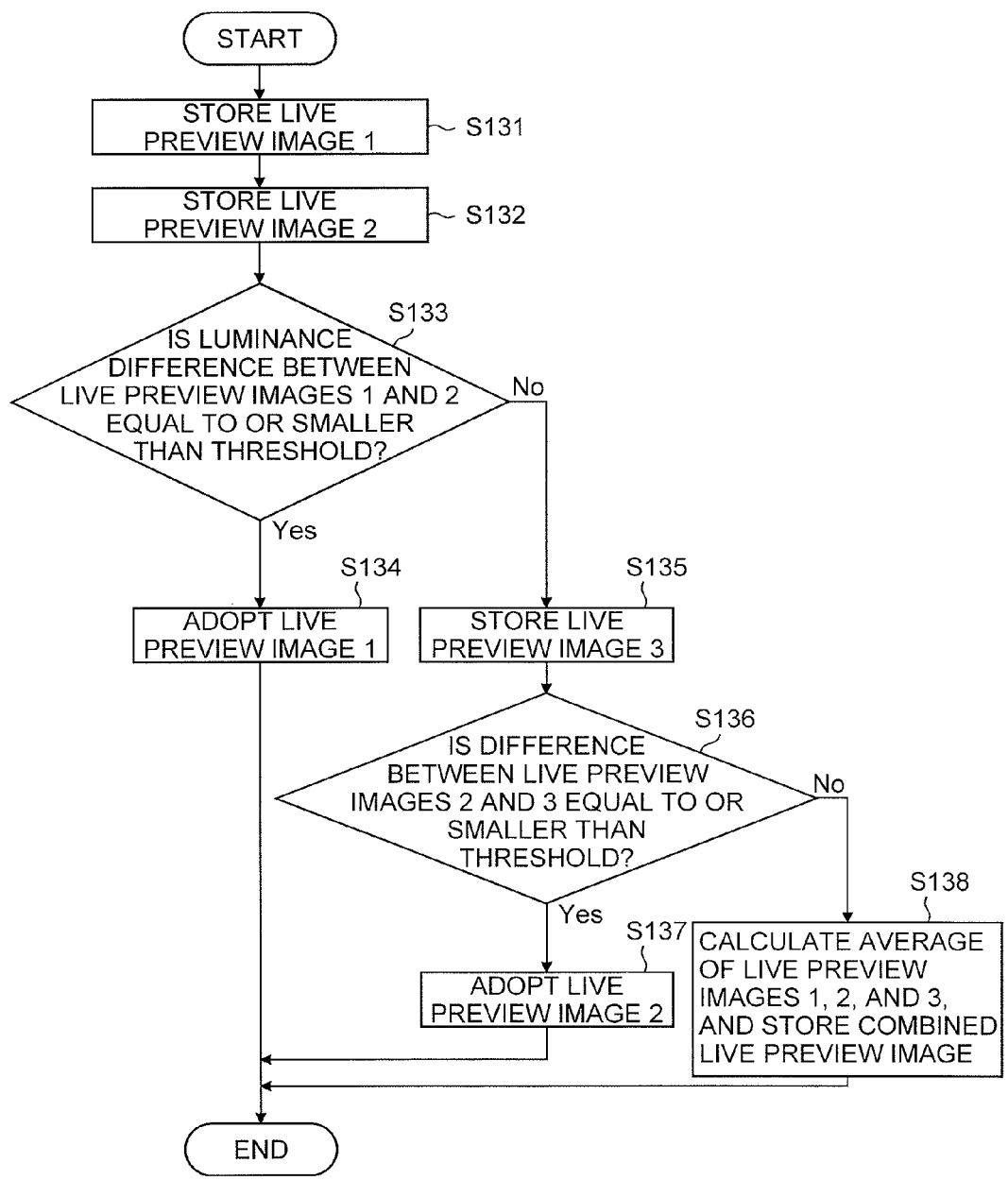
FIG. 19 is a schematic flow chart showing an example of a live preview image acquisition process.

FIG. 19 is a schematic flow chart showing an example of the live preview image acquisition process.

In step S131, an n-th frame (hereinafter, called "live preview image 1") of the live preview images is stored in the temporary storage unit 202. An initial value of n is "1". In step S132, an n+1-th frame (hereinafter, called "live preview image 2") of the live preview images is stored in the temporary storage unit 202. In step S133, whether the luminance difference between the live preview images 1 and 2 is equal to or smaller than a threshold is determined. If the luminance difference between the live preview images 1 and 2 is equal to or smaller than the threshold, the live preview image 1 is adopted as the reference image in step S134. If the luminance difference between the live preview images 1 and 2 is greater than the threshold, an n+2-th frame (hereinafter, called "live preview image 3") of the live preview images is stored in the temporary storage unit 202 in step S135. In step S136, whether the luminance difference between the live preview images 2 and 3 is equal to or smaller than the threshold is determined. If the luminance difference between the live preview images 2 and 3 is equal to or smaller than the threshold, the live preview image 2 is selected as the reference image in step S137. If the luminance difference between the live preview images 2 and 3 is greater than the threshold, in step S138, an average value of the luminance of the live preview images 1, 2, and 3 is calculated, a combined live preview image of one frame is created, and the combined live preview image is adopted as the reference image and stored in the temporary storage unit 202. The calculated average value of luminance is stored in the temporary storage unit 202 as the luminance of the reference image and used to calculate the luminance difference between the photographed image and the reference image.

Figure 20:
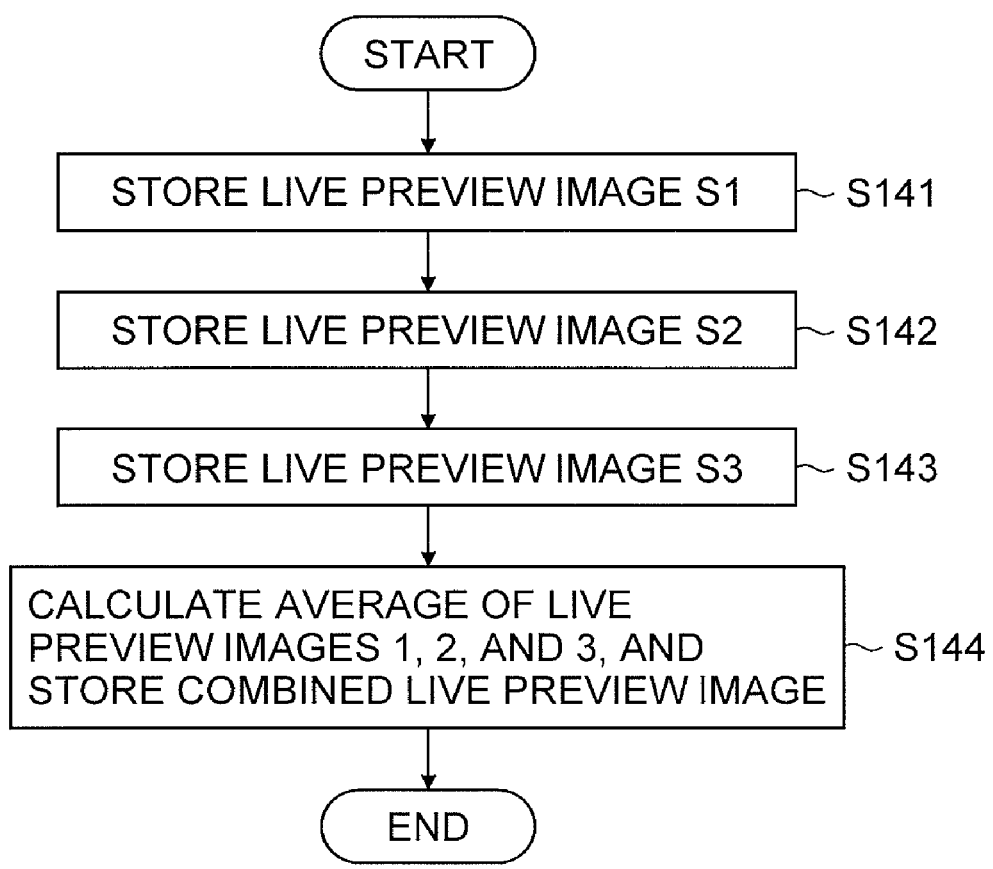
FIG. 20 is a schematic flow chart showing another example of the live preview image acquisition process.

FIG. 20 is a schematic flow chart showing another example of the live preview image acquisition process.

In step S141, the n-th frame (live preview image 1) of the live preview images is stored in the temporary storage unit 202. The initial value of n is "1". In step S142, the n+1-th (live preview image 2) of the live preview images is stored in the temporary storage unit 202. In step S143, the n+2-th frame (live preview image 3) of the live preview images is stored in the temporary storage unit 202. In step S144, an average value of the luminance of the live preview images 1, 2, and 3 is calculated, a combined live preview image of one frame is created, and the combined live preview image is adopted as the reference image and stored in the temporary storage unit 202.

The combined live preview image of one frame can be easily generated by, for example, setting a luminance average value of a plurality of adjacent frames (live preview images 1, 2, and 3 in the example) to an original image of one frame (for example, live preview image 3). Live preview images without exposure unevenness can be presented to the user by consecutively displaying, on the LCD 40, the consecutively generated combined live preview image with a plurality of frames.

For example, the image signal processing circuit 34 converts the RGB signal outputted from the CMOS image sensor 26 into luminance data (Y data) and color difference data (Cr, Cb data) and calculates an average value of the luminance of a plurality of frames in each pixel. The combined live preview image is formed based on new luminance data (Y data) and color difference data (Cr, Cb data) formed by the obtained average value of luminance in each pixel.

An imaging apparatus and an imaging control method according to a seventh embodiment will now be described.

Figure 21:
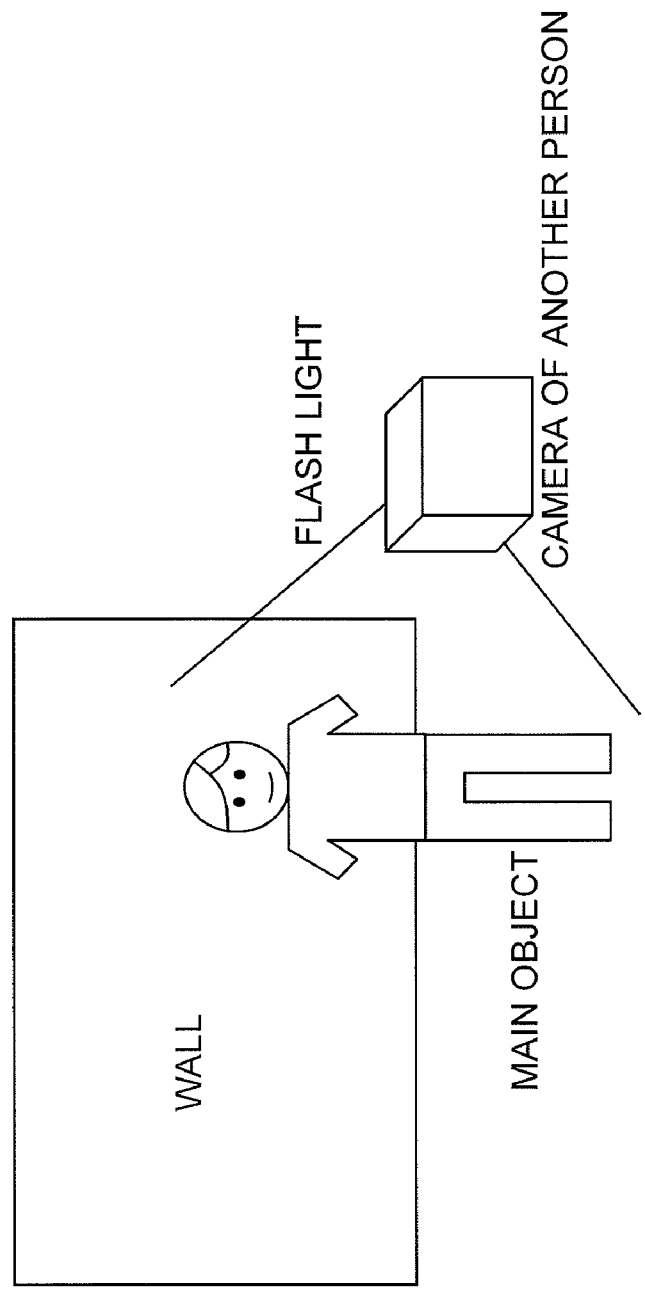
FIG. 21 is a diagram showing a scene in which flashlight of a camera of another person is emitted.
Figure 22:
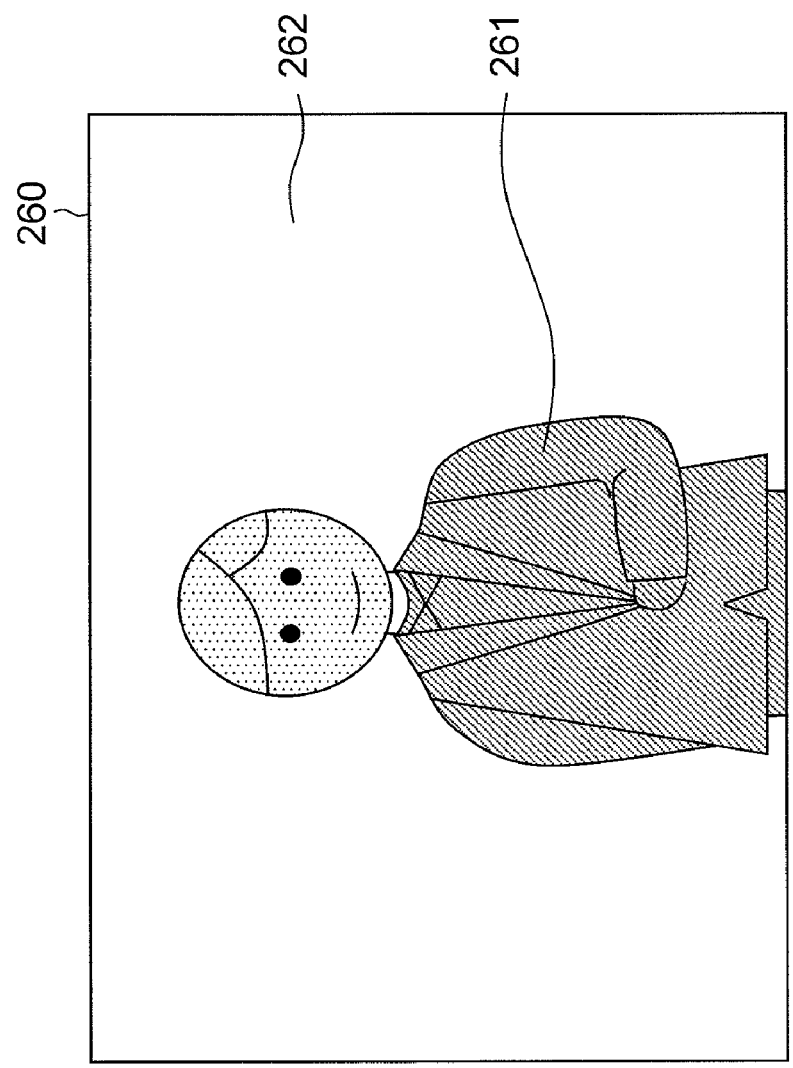
FIG. 22 is a diagram for explaining exposure unevenness in the scene shown in FIG. 21.

As shown in FIG. 21, when flashlight of a camera of another person is emitted near the main object, the exposure unevenness specific to the rolling shutter system may not emerge as a simple up/down separation in the photographed image. For example, as shown in FIG. 22, exposure unevenness emerges in a short-distance main object part 261 in a photographed image 260, and exposure unevenness does not emerge in a long-distance wall part 262.

The wall is far away from the camera of another person in the scene of FIG. 21 and is not affected much by the flashlight. In this way, the influence by the exposure unevenness in the rolling shutter system is greater when the distance from the emission part is shorter, and the influence is smaller when the distance from the emission part is longer. The possibility that the main object is close to the photographer is high, and there is a problem if flashlight of the camera of another person is emitted from around or back of the photographer. Therefore, in the present embodiment, the photographed image is two-dimensionally divided into a plurality of divided areas, the weight of correction is increased for short-distance divided areas with short object distance, and the weight of correction is decreased for long-distance divided areas with long object distance.

Figure 23:
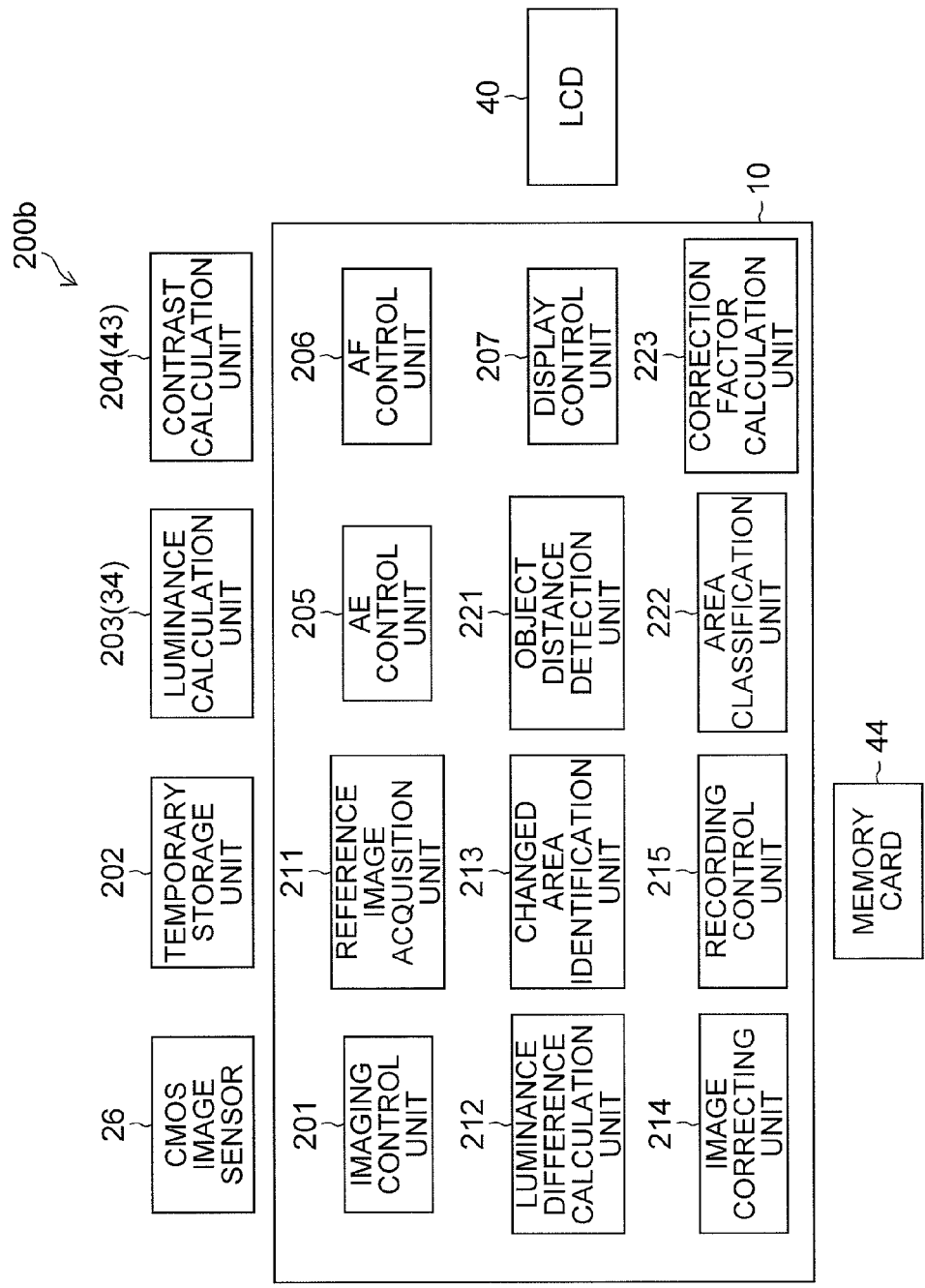
FIG. 23 is a main part functional block diagram of the imaging apparatus according to a seventh embodiment of the present invention.

FIG. 23 is a main part block diagram of an imaging apparatus 200b (digital camera 1 of FIG. 1) according to the seventh embodiment. The same constituent elements as in the imaging apparatus 200a of the first embodiment shown in FIG. 17 are designated with the same reference numerals. Only the items different from the sixth embodiment will be described.

Figure 25A:
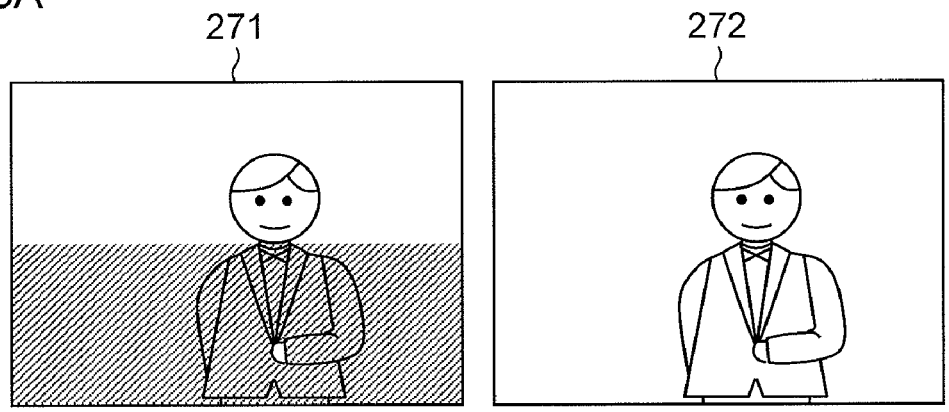
FIG. 25A is an explanatory diagram showing an example of a photographic image and a live preview image.
Figure 25B:
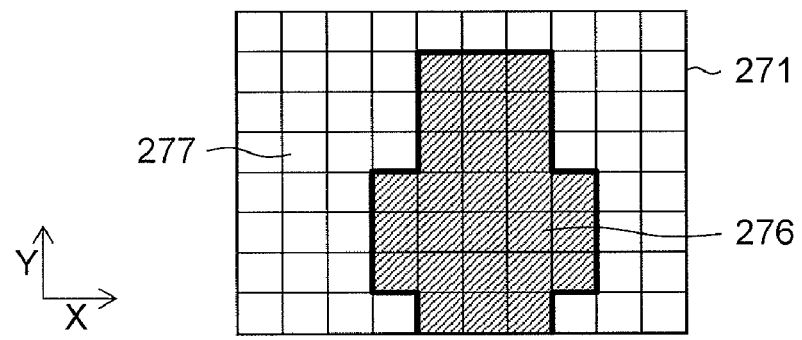
FIG. 25B is an explanatory diagram showing an example of area division.

In the present example, as shown in FIG. 25B, the photographed image is two-dimensionally divided into a plurality of divided areas in a horizontal direction X and a vertical direction Y. The number of divided areas is not particularly limited, and setting the photometric divided areas (16×16 divided areas) allows to use the divided photometric values of the areas in the luminance correction.

An object distance detection unit 221 detects an object distance in each divided area. The object distance detection unit 221 of the present example detects the object distance of each divided area based on the focus lens position and the AF evaluation value at the auto focus. At the auto focus, the AF control unit 206 moves the focus lens from the focus lens position for focusing the focus lens on the shortest imaging distance to the focus lens position for infinite focus. The contrast calculation unit 204 calculates the AF evaluation value in each divided area. At the auto focus, the AF control unit 206 detects the focus lens position with the maximum contrast in each divided area. The object distance detection unit 221 calculates the object distance of each divided area based on the focus lens position with the maximum contrast in each divided area detected by the AF control unit 206.

The configuration of detecting the object distance of each divided area is not limited to the case of detecting the object distance based on the contrast of the image. For example, a hardware sensor (for example, distance image sensor) that directly detects the object distance may also be used.

Based on the object distances of the divided areas, an area classification unit 222 divides the two-dimensionally divided areas into correction execution areas, for which the luminance difference is corrected, and correction non-execution areas, for which the luminance difference is not corrected. The areas may be divided based on the size of the luminance difference (luminance difference between the photographed image and the reference image) of each divided area. The image correcting unit 214 of the present embodiment corrects the luminance difference only in the correction execution areas.

For each divided area, a correction factor calculation unit 223 calculates a correction factor to be applied to the luminance difference based on the object distance.

Figure 24:
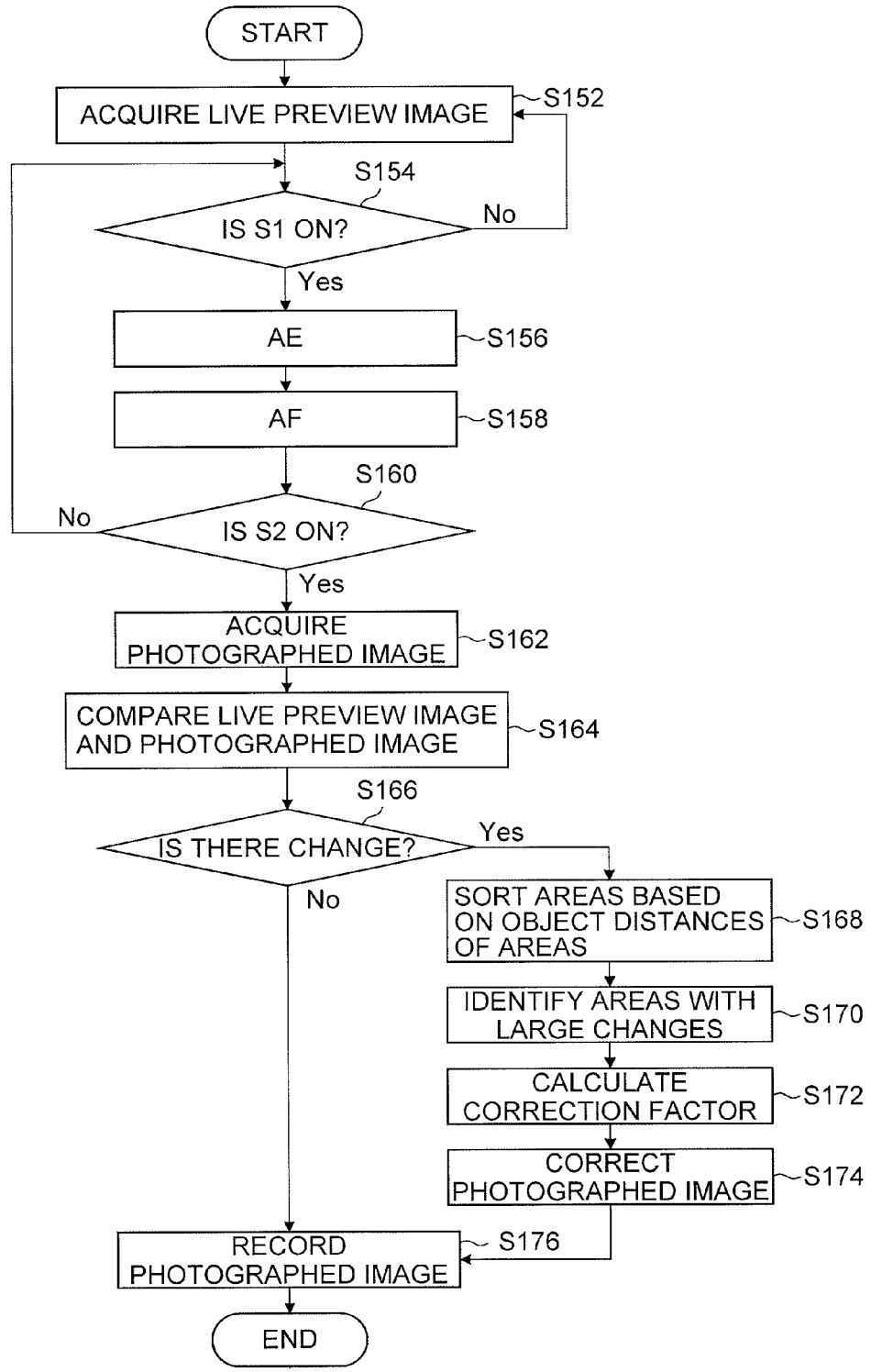
FIG. 24 is a flow chart showing the imaging control process in the seventh embodiment of the present invention.

FIG. 24 is a flow chart showing an example of a flow of the imaging control process according to the seventh embodiment. The CPU 10 executes the present process in accordance with a program.

Steps S152 to S166 are the same as steps S102 to S116 of FIG. 18 in the sixth embodiment, and the description will not be repeated.

However, in the present example, the object distance detection unit 221 detects the object distance of each divided area during the AF control of step S158.

If there is a luminance change between a photographed image 271 and a reference image 272 of the live preview images as shown in FIG. 25A, the area classification unit 222 sorts the divided areas based on the object distance of each divided area in step S168.

In the present example, the object distance of each divided area is compared to a threshold for near-far determination. As shown in FIG. 25B, a short-distance divided area 276, in which the object distance is equal to or smaller than the threshold, is classified as a correction execution area, and a long-distance divided area 277, in which the object distance is greater than the threshold, is classified as a correction non-execution area. At least the divided areas determined to be infinite distance are classified as correction non-execution areas, because the possibility of exposure unevenness is extremely low. This is because the flashlight never reaches the object determined to be infinite distance. The correction execution areas may be classified into two or more groups.

In step S170, the area classification unit 222 identifies areas with large luminance change.

In the present example, the areas are sorted also based on the luminance difference (luminance difference between the photographed image and the reference image of the live preview images) of each divided area.

For example, in the process of steps S168 and S170, a divided area, in which the object distance is equal to or smaller than the threshold for near-far determination and the luminance difference is greater than the threshold for luminance difference size determination, is classified as a correction execution area. On the other hand, a divided area, in which the object distance is greater than the threshold for near-far determination and the luminance difference is equal to or smaller than the threshold for luminance difference size determination, is classified as a correction non-execution area.

In step S172, for each divided area, the correction factor calculation unit 223 calculates a correction factor indicative of a correction weight based on the object distance. More specifically, the correction factor calculation unit 223 calculates a correction factor of each divided area to be applied to the luminance difference based on the object distance of each divided area.

In the present example, the divided areas, in which the object distance is within a specific range, are considered most important, and the correction factor is smaller for the divided areas with greater object distance. For example, correction factors in inverse proportion to the object distance are allocated. More specifically, if the luminance difference is the same, the correction factors are smaller for the divided areas with larger object distance. The image correcting unit 214 makes the correction amount for the luminance difference smaller if the correction factor is smaller. In the present example, the correction amount is luminance difference x correction factor.

In step S174, the image correcting unit 214 corrects the luminance difference of the photographed image.

In the present example, only the correction execution areas determined by the area classification unit 222 are corrected. The divided areas, in which the correction factors calculated by the correction factor calculation unit 223 are smaller, are corrected in smaller correction amounts.

Figure 25C:
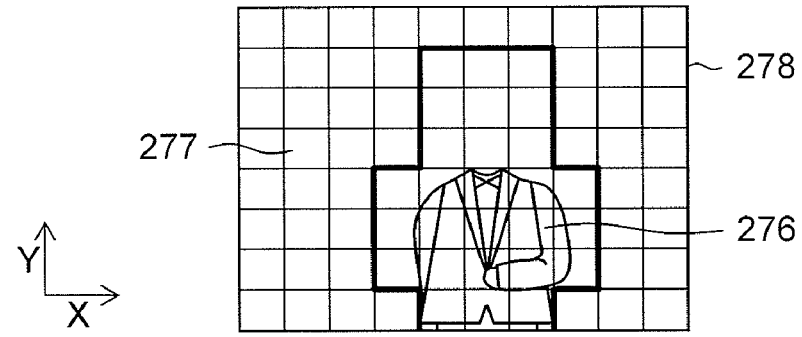
FIG. 25C is an explanatory diagram showing an example of a difference image.

FIG. 25C illustrates a luminance difference image 278 of the photographed image 271 and the reference image 272 of the live preview images. The luminance difference image 278 is weighted by the correction factors. More specifically, the correction factors are applied to the pixel values (indicating the luminance differences in the pixels) in the correction execution areas. The correction factor of the correction non-execution areas is set to 0.

A photographed image without exposure unevenness can be obtained by subtracting the luminance of the photographed image by the luminance differences weighted in step S172 in the correction execution areas of the photographed image.

Step S176 is the same as step S124 in the sixth embodiment.

Although an example of changing the correction factors as weights based on the object distances has been described, the present invention is not particularly limited to this.

For example, the threshold of each divided area for the area classification unit 222 to determine the presence of correction may be changed in accordance with the object distance.

The following is a summary of modes for applying priorities or weights of correction based on the object distance.

First, the area classification unit 222 determines the divided areas, in which the object distance is greater than the threshold for near-far determination, as the correction non-execution areas. The area classification unit 222 may determine only the divided areas determined to be infinite distance as the correction non-execution areas. The image correcting unit 214 does not correct the luminance in the correction non-execution areas.

Second, the correction factor calculation unit 223 calculates smaller correction factors relative to the luminance differences in the divided areas with greater object distance. The image correcting unit 214 makes the correction amounts smaller for the divided areas with smaller correction factors. For example, a product of the luminance difference and the correction factor is set as the correction amount of luminance in the correction execution area of the photographed image.

Third, the area classification unit 222 makes the threshold for luminance difference size determination greater for the divided areas with greater object distances and determines the divided areas, in which the luminance differences (luminance differences between the photographed image and the reference image) are equal to or smaller than the threshold for luminance difference size determination, as the correction non-execution areas. The image correcting unit 214 does not correct the luminance in the correction non-execution areas.

It is obvious that the first to third modes can be independently carried out or carried out in combination.

In the present embodiment, the exposure unevenness of the main object, which is likely to be in a short distance, can be surely reduced by mainly correcting the short-distance areas, in which the possibility of luminance change due to outside light emitted from a short distance is high. Meanwhile, the luminance difference is not corrected even if there is a luminance difference when an unexpected object enters a long-distance area. Therefore, the over-correction can be prevented to perform an appropriate correction by applying weights based on the object distances of the divided areas.

Although a digital camera has been described as an example of the imaging apparatus, the present invention can be applied to various imaging apparatuses such as a cell phone with camera.

[Other Embodiments]

The control of exposure/reading of the lines with stripe-pattern exposure unevenness, which is in-plane exposure unevenness caused by flash emission of another person etc., is not limited to the embodiments, and there can be various modes. Any control can be performed as long as the exposure/reading is not sequentially shifted from the first line to the last line, and there are large time differences in the exposure/reading between periodically adjacent lines.

An image generated by the exposure/reading is advantageous in that the distortion (rolling distortion) of an image of a moving object is reduced compared to the conventional method in which the exposure/reading is sequentially shifted from the first line to the last line.

The warning for the detection of exposure unevenness is not limited to the warning displayed on the LCD 40. The warning may be issued by sound, or both sound and characters may be used.

The present invention can also be applied to imaging with flash emission of the photographer. In that case, the exposure period of one frame and the emission timing of flash need to be controlled so that the flashlight uniformly enters during the exposure periods of all lines.

It is obvious that the present invention is not limited to the embodiments, and various modifications can be made without departing from the scope of the present invention.

What is claimed is:

1. An imaging apparatus of a rolling shutter system that starts exposing an imaging element including a light receiving area with a plurality of lines while shifting exposure start timing line by line and that sequentially reads out information on the lines from lines in which a predetermined exposure time has passed, the imaging apparatus comprising:
- a read control device that reads out the information of the lines by controlling read-out lines so that the exposure start timing of all lines of the imaging element is different and the exposure start timing of adjacent lines is significantly shifted on a periodic basis;
- an imaging acquisition device that acquires an image of one frame by sorting the information of the lines sequentially read out by the read control device in order of line positions; and
- an exposure unevenness detection device that detects presence of exposure unevenness included in the acquired image of one frame and caused by flash emission of another person.

2. The imaging apparatus according to claim 1, wherein the read control device reads out the information of odd lines earlier or later among the odd lines and even lines of the imaging element and reads out the information of the even lines later or earlier to significantly shift the exposure start timing of the adjacent odd lines and even lines.

3. The imaging apparatus according to claim 1, wherein the read control device reads out the information of (3n-2) lines (n=1, 2, 3 . . . ) and 3n lines earlier or later among the (3n-2) lines, (3n-1) lines, and 3n lines of the imaging element and reads out the information of the (3n-1) lines later or earlier to significantly shift the exposure start timing of the (3n-1) lines as well as the (3n-2) lines and the 3n lines before and after the (3n-1) lines.

4. The imaging apparatus according to claim 1, wherein the exposure unevenness detection device calculates average luminance of the lines of every line or every N-th line (N: integer two or more) read out with significantly shifted exposure start timing to detect the exposure unevenness based on a change in the average luminance.

5. The imaging apparatus according to claim 2, wherein the exposure unevenness detection device calculates average luminance of the lines of every line or every N-th line (N: integer two or more) read out with significantly shifted exposure start timing to detect the exposure unevenness based on a change in the average luminance.

6. The imaging apparatus according to claim 3, wherein the exposure unevenness detection device calculates average luminance of the lines of every line or every N-th line (N: integer two or more) read out with significantly shifted exposure start timing to detect the exposure unevenness based on a change in the average luminance.

7. The imaging apparatus according to claim 4, wherein the exposure unevenness detection device determines that there is exposure unevenness if the change in the calculated average luminance has a cycle corresponding to intervals of the lines of every line or every N-th line.

8. The imaging apparatus according to claim 5, wherein the exposure unevenness detection device determines that there is exposure unevenness if the change in the calculated average luminance has a cycle corresponding to intervals of the lines of every line or every N-th line.

9. The imaging apparatus according to claim 6, wherein the exposure unevenness detection device determines that there is exposure unevenness if the change in the calculated average luminance has a cycle corresponding to intervals of the lines of every line or every N-th line.

10. The imaging apparatus according to claim 1, wherein the exposure unevenness detection device compares the information of the adjacent lines read out with significantly shifted exposure start timing and determines that there is exposure unevenness if there is a substantially constant luminance difference throughout the entire lines.

11. The imaging apparatus according to claim 2, wherein the exposure unevenness detection device compares the information of the adjacent lines read out with significantly shifted exposure start timing and determines that there is exposure unevenness if there is a substantially constant luminance difference throughout the entire lines.

12. The imaging apparatus according to claim 3, wherein the exposure unevenness detection device compares the information of the adjacent lines read out with significantly shifted exposure start timing and determines that there is exposure unevenness if there is a substantially constant luminance difference throughout the entire lines.

13. The imaging apparatus according to claim 1, further comprising
an exposure unevenness warning device that issues a warning indicative of exposure unevenness if the exposure unevenness detection device detects the exposure unevenness.

14. The imaging apparatus according to claim 2, further comprising
an exposure unevenness warning device that issues a warning indicative of exposure unevenness if the exposure unevenness detection device detects the exposure unevenness.

15. The imaging apparatus according to claim 3, further comprising
an exposure unevenness warning device that issues a warning indicative of exposure unevenness if the exposure unevenness detection device detects the exposure unevenness.

16. The imaging apparatus according to claim 1, further comprising
an exposure unevenness correction device that corrects the information of high-luminance lines, which emerge as periodic exposure unevenness, based on the information of low-luminance lines adjacent to the high-luminance lines if the exposure unevenness detection device detects the exposure unevenness.

17. The imaging apparatus according to claim 2, further comprising
an exposure unevenness correction device that corrects the information of high-luminance lines, which emerge as periodic exposure unevenness, based on the information of low-luminance lines adjacent to the high-luminance lines if the exposure unevenness detection device detects the exposure unevenness.

18. The imaging apparatus according to claim 3, further comprising
an exposure unevenness correction device that corrects the information of high-luminance lines, which emerge as periodic exposure unevenness, based on the information of low-luminance lines adjacent to the high-luminance lines if the exposure unevenness detection device detects the exposure unevenness.

19. The imaging apparatus according to claim 16, wherein the exposure unevenness correction device calculates an average luminance difference in one line between the information of the high-luminance lines and the information of the low-luminance lines adjacent to the high-luminance lines and subtracts the calculated average luminance difference from the information of the high-luminance lines to correct the information of the high-luminance lines.

20. The imaging apparatus according to claim 17, wherein the exposure unevenness correction device calculates an average luminance difference in one line between the information of the high-luminance lines and the information of the low-luminance lines adjacent to the high-luminance lines and subtracts the calculated average luminance difference from the information of the high-luminance lines to correct the information of the high-luminance lines.

21. The imaging apparatus according to claim 18, wherein the exposure unevenness correction device calculates an average luminance difference in one line between the information of the high-luminance lines and the information of the low-luminance lines adjacent to the high-luminance lines and subtracts the calculated average luminance difference from the information of the high-luminance lines to correct the information of the high-luminance lines.

22. The imaging apparatus according to claim 19, wherein the information of the lines is values of R, G, and B pixels, and the exposure unevenness correction device sorts the calculated average luminance difference by ratio of R, G, and B corresponding to the color temperature of the flashlight and subtracts the sorted R, G, and B values from the values of the R, G, and B pixels of the high-luminance lines.

23. The imaging apparatus according to claim 20, wherein the information of the lines is values of R, G, and B pixels, and the exposure unevenness correction device sorts the calculated average luminance difference by ratio of R, G, and B corresponding to the color temperature of the flashlight and subtracts the sorted R, G, and B values from the values of the R, G, and B pixels of the high-luminance lines.

24. The imaging apparatus according to claim 21, wherein the information of the lines is values of R, G, and B pixels, and the exposure unevenness correction device sorts the calculated average luminance difference by ratio of R, G, and B corresponding to the color temperature of the flashlight and subtracts the sorted R, G, and B values from the values of the R, G, and B pixels of the high-luminance lines.

25. An imaging control method of a rolling shutter system for starting to expose an imaging element including a light receiving area with a plurality of lines while shifting exposure start timing line by line and for sequentially reading out information on the lines from lines in which a predetermined exposure time has passed, the imaging control method comprising:

a step of reading out the information of the lines by controlling read-out lines so that the exposure start timing of all lines of the imaging element is different and the exposure start timing of adjacent lines is significantly shifted on a periodic basis;

a step of acquiring an image of one frame by sorting the information of the sequentially read out lines in order of line positions; and a step of detecting the presence of exposure unevenness included in the acquired image of one frame and caused by flash emission of another person.

26. The imaging control method according to claim 25, further comprising a step of issuing a warning indicative of exposure unevenness if the exposure unevenness is detected.

27. The imaging control method according to claim 25, further comprising a step of correcting the information of high-luminance lines, which emerge as periodic exposure unevenness, based on the information of low-luminance lines adjacent to the high-luminance lines if the exposure unevenness is detected.

28. The imaging control method according to claim 26, further comprising a step of correcting the information of high-luminance lines, which emerge as periodic exposure unevenness, based on the information of low-luminance lines adjacent to the high-luminance lines if the exposure unevenness is detected.

* * * * *